United States Patent
Kumada et al.

(10) Patent No.: US 10,714,776 B2
(45) Date of Patent: Jul. 14, 2020

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventors: Mitsunori Kumada, Kanagawa (JP); Hidetaka Nishimura, Kanagawa (JP); Hiroshi Takeda, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 333 days.

(21) Appl. No.: 15/501,483

(22) PCT Filed: Aug. 8, 2014

(86) PCT No.: PCT/JP2014/071077
§ 371 (c)(1),
(2) Date: Feb. 3, 2017

(87) PCT Pub. No.: WO2016/021062
PCT Pub. Date: Feb. 11, 2016

(65) Prior Publication Data
US 2017/0222238 A1    Aug. 3, 2017

(51) Int. Cl.
*H01M 8/04858* (2016.01)
*H01M 8/04* (2016.01)
(Continued)

(52) U.S. Cl.
CPC ..... *H01M 8/04925* (2013.01); *B60L 15/2072* (2013.01); *B60L 50/50* (2019.02);
(Continued)

(58) Field of Classification Search
CPC .. H01M 16/006; H01M 2250/20; H01M 8/04; H01M 8/04865; H01M 8/04895;
(Continued)

(56) References Cited

U.S. PATENT DOCUMENTS

2004/0175602 A1   9/2004  Tahara
2010/0013490 A1   1/2010  Manabe et al.
(Continued)

FOREIGN PATENT DOCUMENTS

JP    2009-21194 A    1/2009
JP    5062518 B2     10/2012
(Continued)

*Primary Examiner* — Adam A Arciero
(74) *Attorney, Agent, or Firm* — Foley & Lardner LLP

(57) ABSTRACT

A fuel cell system includes a battery, a fuel cell configured to generate power in accordance with a load, an inverter configured to convert power output from the fuel cell into alternating-current power and supply the alternating-current power to a motor, and a converter configured to control voltage between the inverter and the fuel cell using power output from the battery. The fuel cell system includes a voltage control unit configured to control the converter such that the voltage between the inverter and the fuel cell does not fall below a voltage lower limit of the inverter, and a lower limit voltage control unit configured to, when power required by the motor increases, cause the voltage between the inverter and the fuel cell to fall below the voltage lower limit of the inverter.

12 Claims, 20 Drawing Sheets

(51) Int. Cl.
    B60L 50/50     (2019.01)
    B60L 58/40     (2019.01)
    B60L 50/72     (2019.01)
    B60L 15/20     (2006.01)
    H01M 16/00     (2006.01)
(52) U.S. Cl.
    CPC ............. *B60L 50/72* (2019.02); *B60L 58/40*
        (2019.02); *H01M 8/04* (2013.01); *H01M*
        *8/04865* (2013.01); *H01M 8/04895* (2013.01);
        *H01M 16/006* (2013.01); *H01M 2250/20*
        (2013.01); *Y02T 10/7258* (2013.01); *Y02T*
        *90/32* (2013.01); *Y02T 90/34* (2013.01)
(58) Field of Classification Search
    CPC ............ H01M 8/04925; B60L 15/2072; B60L
        50/50; B60L 50/72; B60L 58/40; Y02T
        10/7258; Y02T 90/32; Y02T 90/34
    See application file for complete search history.

(56) References Cited

U.S. PATENT DOCUMENTS

| | | | |
|---|---|---|---|
| 2010/0068576 A1* | 3/2010 | Hamada | H01M 8/04559 |
| | | | 429/411 |
| 2014/0132193 A1 | 5/2014 | Kajiwara et al. | |
| 2014/0335433 A1 | 11/2014 | Jomori et al. | |

FOREIGN PATENT DOCUMENTS

| | | |
|---|---|---|
| JP | 2012-221890 A | 11/2012 |
| JP | 2013-13171 A | 1/2013 |
| WO | WO 2008/146928 A1 | 12/2008 |
| WO | WO 2013/080358 A1 | 6/2013 |
| WO | WO-2013/080463 A1 | 6/2013 |
| WO | WO-2013080463 A1 * | 6/2013 |

* cited by examiner

FUEL CELL SYSTEM AND CONTROL METHOD FOR FUEL CELL SYSTEM

TECHNICAL FIELD

The present invention relates to a fuel cell system that supplies power output from fuel cells to a motor via an inverter, and a control method for the fuel cell system.

BACKGROUND ART

JP 5062518B discloses a fuel cell system that supplies power output from fuel cells to an inverter by controlling the voltage of fuel cells using a DC/DC converter.

SUMMARY OF INVENTION

In such a fuel cell system, with an increase in power required from the fuel cells in response to an accelerator pedal operation, power output from the fuel cells to a motor is increased by reducing the voltage of the fuel cells.

However, when electrolyte membranes of the fuel cells are in a dry state, even if the voltage of the fuel cells is reduced to a voltage lower limit of the inverter upon receiving an acceleration request from a driver, power supplied from the fuel cells to the motor is insufficient due to a poor I-V characteristic of the fuel cells.

In this state, as current output from the fuel cells is restricted, the amount of water vapor generated in the fuel cells is restricted as well, and it takes time to place the electrolyte membranes in a wet state. Therefore, even during the acceleration, that is, while power required by the motor is increasing, the power generation performance of the fuel cells does not recover, and a low drivability state continues.

The present invention has been made in view of the foregoing issue, and aims to provide a fuel cell system that rapidly improves the power generation performance of fuel cells with an increase in power required by a motor, and a control method for the fuel cell system.

According to one aspect of the present invention, a fuel cell system includes a battery, a fuel cell configured to generate power in accordance with a load, an inverter configured to convert power output from the fuel cell into alternating-current power and supply the alternating-current power to a motor, and a converter configured to control voltage between the inverter and the fuel cell using power output from the battery. The fuel cell system includes a voltage control unit configured to control the converter such that the voltage between the inverter and the fuel cell does not fall below a voltage lower limit of the inverter, and a lower limit voltage control unit configured to, when power required by the motor increases, cause the voltage between the inverter and the fuel cell to fall below the voltage lower limit of the inverter.

DESCRIPTION OF EMBODIMENTS

Embodiments of the present invention will be described below with reference to the drawings and the like.

First Embodiment

Figure 1:
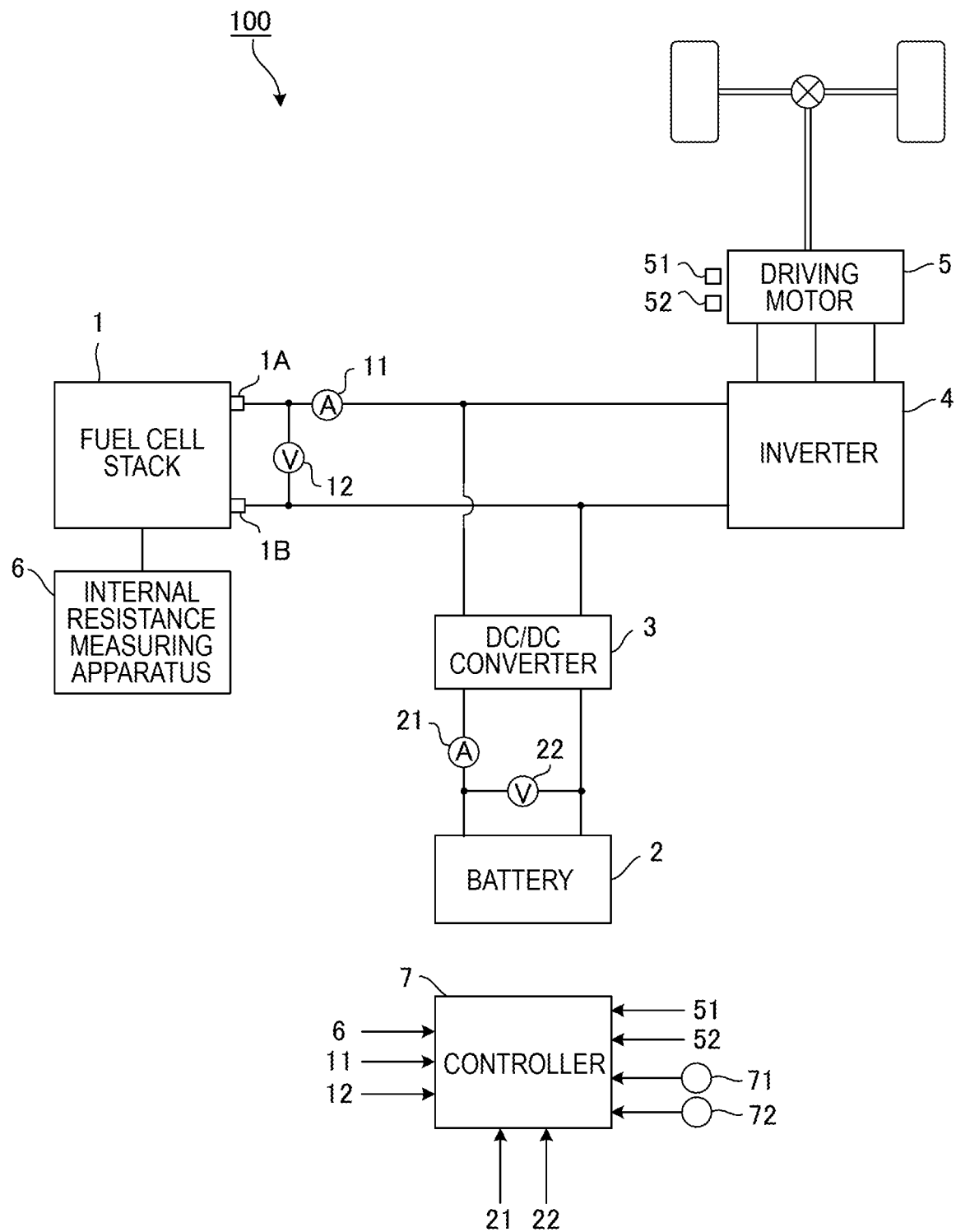
FIG. 1 shows a configuration of a fuel cell system according to a first embodiment of the present invention.

FIG. 1 shows a configuration of a fuel cell system 100 according to a first embodiment of the present invention.

The fuel cell system 100 is a power source system that supplies cathode gas and anode gas from outside to a fuel cell stack 1, and causes the fuel cell stack 1 to generate power in accordance with electric loads. In the present embodiment, the fuel cell system 100 is mounted in a vehicle.

The fuel cell system 100 includes the fuel cell stack 1, a battery 2, a DC/DC converter 3, an inverter 4, a driving motor 5, an internal resistance measuring apparatus 6, and a controller 7.

The fuel cell stack 1 is a lamination battery made by laminating several hundred fuel cells. The fuel cell stack 1 generates power using anode gas and cathode gas supplied thereto. The fuel cell stack 1 has a positive electrode terminal 1A and a negative electrode terminal 1B, respectively at the cathode electrode side and the anode electrode side, as electrode terminals for extracting power.

Each fuel cell is composed of an anode electrode (fuel electrode), a cathode electrode (oxidant electrode), and an electrolyte membrane interposed between the anode electrode and the cathode electrode. At the electrolyte membranes of the fuel cells, electrochemical reactions are caused by anode gas (fuel gas) containing hydrogen, which is supplied to the anode electrodes, and by cathode gas (oxidant gas) containing oxygen, which is supplied to the cathode electrodes. The following electrochemical reactions proceed at the anode electrodes and the cathode electrodes.

Anode electrodes: $2H^2 \rightarrow 4H^+ + 4e^-$     (1)

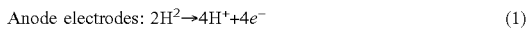

Cathode electrodes: $4H^+ + 4e^- + O^2 \rightarrow 2H^2O$     (2)

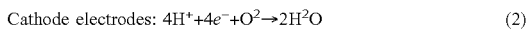

The foregoing electrochemical reactions (1) and (2) generate an electromotive force and water. In the fuel cell stack 1, the laminated fuel cells are connected in series. Thus, the sum of cell voltages generated in the fuel cells is the output voltage of the fuel cell stack 1 (e.g., several hundred volts).

A cathode gas supplying/discharging apparatus and an anode gas supplying/discharging apparatus, which are not illustrated, respectively supply cathode gas and anode gas to the fuel cell stack 1.

The cathode gas supplying/discharging apparatus supplies cathode gas to the fuel cell stack 1, and discharges cathode off-gas discharged from the fuel cell stack 1 to the outer air. The cathode gas supplying/discharging apparatus is composed of, for example, a compressor that supplies cathode gas, and a pressure control valve that controls cathode gas pressure.

The anode gas supplying/discharging apparatus supplies anode gas to the fuel cell stack 1, and discharges anode off-gas from the fuel cell stack 1. The anode gas supplying/discharging apparatus is composed of, for example, a pressure control valve that supplies anode gas from a high-pressure tank storing anode gas to the fuel cell stack 1, and a purge valve that discharges anode off-gas from the fuel cell stack.

The fuel cell stack 1 is connected to the inverter 4 and to the DC/DC converter 3. The fuel cell stack 1 supplies power to the driving motor 5 via the inverter 4, and also to, for example, a non-illustrated auxiliary machine. Examples of the auxiliary machine for the fuel cell stack 1 include a compressor that supplies cathode gas to the fuel cell stack 1, and a pump that circulates cooling water to the fuel cell stack 1. The auxiliary machine is connected between the DC/DC converter 3 and the battery 2, for example.

A stack current sensor 11 and a stack voltage sensor 12 are connected to the fuel cell stack 1.

The stack current sensor 11 is connected to the positive electrode terminal 1A of the fuel cell stack 1, and detects current that the driving motor 5 extracts from the fuel cell stack 1. The stack current sensor 11 outputs a detection signal indicating the detected current to the controller 7. Hereinafter, current extracted from the fuel cell stack 1 is referred to as "stack current."

The stack voltage sensor 12 is connected between the positive electrode terminal 1A and the negative electrode terminal 1B of the fuel cell stack 1, and detects voltage generated between the positive electrode terminal 1A and the negative electrode terminal 1B. The stack voltage sensor 12 outputs a detection signal indicating the detected voltage to the controller 7. Hereinafter, voltage output from the fuel cell stack 1 is referred to as "stack voltage." Sack voltage mentioned herein denotes voltage between the fuel cell stack 1 and the inverter 4.

The battery 2 is a secondary battery that assists power generation of the fuel cell stack 1, and realized by, for example, a lithium-ion battery. When power of the fuel cell stack 1 is insufficient, the battery 2 discharges power.

Power generated by the fuel cell stack 1 is insufficient in some situations. Possible examples of such situations include when power required by the driving motor 5 increases, especially when accelerating the vehicle, and when the power generation characteristic of the fuel cell stack 1 has not been improved, for example, immediately after the activation of the fuel cell system 100.

A battery current sensor 21 and a battery voltage sensor 22 are connected to the battery 2. The battery current sensor 21 is connected to a positive electrode terminal of the battery 2, and detects current discharged from the battery 2. The battery voltage sensor 22 detects inter-terminal voltage generated between the positive electrode terminal and a negative electrode terminal of the battery 2.

The DC/DC converter 3 is connected between the fuel cell stack 1 and the battery 2. The DC/DC converter 3 is a bidirectional voltage converter that converts both of voltage of the fuel cell stack 1 and voltage of the battery 2. The DC/DC converter 3 is controlled by the controller 7.

The DC/DC converter 3 increases or reduces voltage between the fuel cell stack 1 and the inverter 4 using power output from the battery 2, without exceeding a preset voltage range. As voltage of the fuel cell stack 1 is increased or reduced, current output from the fuel cell stack 1, that is, generated power (output current×output voltage), decreases or increases.

The inverter 4 converts power output from at least one of the power sources, that is, the fuel cell stack 1 and the battery 2, into alternating-current power, and supplies the alternating-current power to the driving motor 5. In the present embodiment, the fuel cell stack 1 supplies power to the inverter 4, and the battery 2 also supplies power to the inverter 4 via the DC/DC converter 3 as needed.

The driving motor 5 is an electric motor that is rotated and driven by alternating current output from the inverter 4. In the present embodiment, the driving motor 5 is realized by a three-phase alternating-current motor that drives the vehicle.

The driving motor 5 includes a motor rotation speed sensor 51 that detects a rotation speed of a rotor that composes the driving motor 5, and a motor torque sensor 52 that detects the torque of the driving motor 5. The motor rotation speed sensor 51 and the motor torque sensor 52 output their respective detection signals to the controller 7.

The internal resistance measuring apparatus 6 measures the internal resistance of the fuel cell stack 1 to detect a wet/dry state of the fuel cell stack 1.

Specifically, the internal resistance measuring apparatus 6 supplies alternating current having a predetermined frequency to the fuel cell stack 1, and detects output voltage and output current of the fuel cell stack 1. The internal resistance measuring apparatus 6 computes the amplitudes of alternating-current components of the output voltage and the output current of the fuel cell stack 1, and calculates the HFR, that is, the internal resistance, of the fuel cell stack 1 by dividing the amplitude of the output voltage by the amplitude of the output current.

In place of the internal resistance measuring apparatus 6, the DC/DC converter 3 may supply alternating current having a predetermined frequency to the fuel cell stack 1 and measure the HFR of the fuel cell stack 1 using detection signals from the stack current sensor 11 and the stack voltage sensor 12. The internal resistance measuring apparatus 6 outputs a signal indicating the measured HFR to the controller 7.

The controller 7 is composed of a microcomputer provided with a central processing unit (CPU), a read-only memory (ROM), a random-access memory (RAM), and an input/output (I/O) interface.

The controller 7 receives, as input, detection signals from the aforementioned internal resistance measuring apparatus 6, stack current sensor 11, stack voltage sensor 12, battery current sensor 21, battery voltage sensor 22, motor rotation speed sensor 51, and motor torque sensor 52. The controller 7 also receives, as input, detection signal from various other sensors that are necessary for controlling power generation of the fuel cell stack 1.

The other sensors include, for example, a vehicle speed sensor 71 that measures a vehicle speed, and an accelerator opening degree sensor 72 that calculates an accelerator opening degree by detecting a depression amount of an accelerator pedal. Although not illustrated, the other sensors also include, for example, a state of charge (SOC) sensor that detects the SOC of the battery 2, and a key sensor that detects a start request or a stop request for the fuel cell system 100 on the basis of ON/OFF of a start key.

Using the DC/DC converter 3, the controller 7 controls generated power supplied from the fuel cell stack 1 to the inverter 4 on the basis of the detection signals from various sensors.

Figure 2:
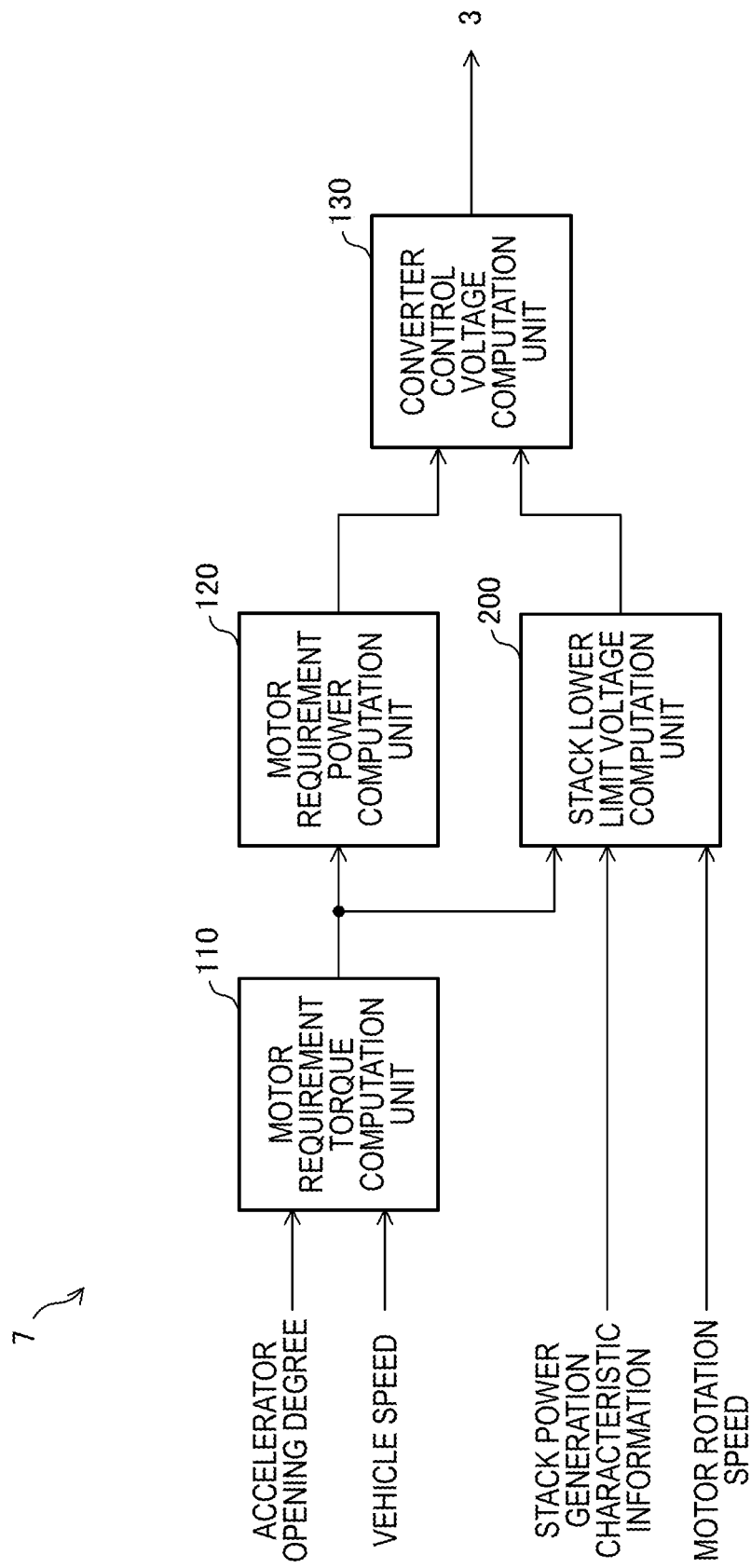
FIG. 2 is a block diagram showing a functional configuration of a controller that controls the fuel cell system.

FIG. 2 is a block diagram showing a functional configuration of the controller 7 that controls the fuel cell system 100.

The controller 7 includes a motor requirement torque computation unit 110, a motor requirement power computation unit 120, a converter control voltage computation unit 130, and a stack lower limit voltage computation unit 200.

The motor requirement torque computation unit 110 computes the torque required in the driving motor 5. Hereinafter, the torque required in the driving motor 5 is referred to as the "motor requirement torque" or "requirement torque."

In the present embodiment, the motor requirement torque computation unit 110 calculates the motor requirement torque on the basis of a vehicle speed detected by the vehicle speed sensor 71 and an accelerator opening degree detected by the accelerator opening degree sensor 72.

A torque map indicating the relationships among accelerator opening degrees, vehicle speeds, and motor requirement torques is prestored in the motor requirement torque computation unit 110. Upon obtaining an accelerator opening degree and a vehicle speed, the motor requirement torque computation unit 110 refers to the torque map, and calculates a motor requirement torque corresponding to an operation point specified by the obtained accelerator opening degree and the vehicle speed.

The motor requirement torque computation unit 110 outputs the calculated motor requirement torque to the stack lower limit voltage computation unit 200 and the motor requirement power computation unit 120.

On the basis of the motor requirement torque, the motor requirement power computation unit 120 computes generated power that the driving motor 5 requires from the fuel cell stack 1. Hereinafter, generated power required from the fuel cell stack 1 is referred to as "motor requirement power."

In the present embodiment, a requirement power map indicating the relationships between motor requirement torques and motor requirement powers is prestored in the motor requirement power computation unit 120. Upon obtaining the motor requirement torque, the motor requirement power computation unit 120 refers to the requirement power map, and calculates a motor requirement power corresponding to the obtained motor requirement torque.

The motor requirement power computation unit 120 also obtains dischargeable power on the basis of the SOC of the battery 2, subtracts the dischargeable power from the calculated motor requirement power, and outputs a value of the result of subtraction to the converter control voltage computation unit 130 as a motor requirement power. When the fuel cell stack 1 supplies generated power to the auxiliary machine, the motor requirement power computation unit 120 adds power consumed by the auxiliary machine to the motor requirement power, and outputs a value of the result of addition as a motor requirement power.

The stack lower limit voltage computation unit 200 computes a lower limit voltage of the fuel cell stack 1 on the basis of the motor requirement torque, stack power generation characteristic information, and a motor rotation speed.

The stack power generation characteristic information is a parameter for determining whether the current-voltage characteristic of the fuel cell stack 1 can achieve the rated power necessary for driving the driving motor 5. The rated power denotes an upper limit of power necessary for driving the driving motor 5 within a preset range of use.

Examples of the stack power generation characteristic information include a wet/dry state of the electrolyte membranes in the fuel cell stack 1, the temperature of the fuel cell stack 1, and output power of the fuel cell stack 1. Hereinafter, the current-voltage characteristic of the fuel cell stack 1 is simply referred to as the "I-V characteristic."

When the I-V characteristic of the fuel cell stack 1 is favorable, the stack lower limit voltage computation unit 200 outputs a voltage lower limit of the inverter 4 to the converter control voltage computation unit 130. The voltage lower limit of the inverter 4 guarantees driving of the driving motor 5 within the range of use, and is hereinafter referred to as the "INV performance guarantee voltage."

The converter control voltage computation unit 130 computes voltage of the DC/DC converter 3 at the fuel cell stack 1 side so that voltage between the fuel cell stack 1 and the inverter 4 does not fall below the INV performance guarantee voltage.

The converter control voltage computation unit 130 also calculates voltage of the DC/DC converter 3 so that generated power of the fuel cell stack 1 matches the motor requirement power. For example, a product of a detected value of the stack current sensor 11 and a detected value of the stack voltage sensor 12 is used as the generated power of the fuel cell stack 1.

As such, the converter control voltage computation unit 130 constitutes a voltage control unit that controls the DC/DC converter 3 so that voltage between the fuel cell stack 1 and the inverter 4 does not fall below the INV performance guarantee voltage.

The converter control voltage computation unit 130 outputs voltage of the DC/DC converter 3 at the fuel cell stack 1 side to the DC/DC converter 3 as stack control voltage. In this way, voltage of the fuel cell stack 1 is adjusted so as to reduce the deviation between generated power of the fuel cell stack 1 and the motor requirement power.

As described above, the controller 7 obtains the motor requirement power in accordance with the motor requirement torque, and reduces voltage of the DC/DC converter 3 at the fuel cell stack 1 side in accordance with the obtained motor requirement power. In this way, the fuel cell stack 1 supplies power compliant with a request from the driver to the driving motor 5 via the inverter 4.

However, when the I-V characteristic of the fuel cell stack 1 is not favorable, requirement power necessary for driving the driving motor 5 may not be secured even if voltage between the fuel cell stack 1 and the inverter 4 has been reduced to the INV performance guarantee voltage.

The I-V characteristic of the fuel cell stack 1 deteriorates, for example, when the electrolyte membranes in the fuel cell stack 1 are in a dry state, and when the temperature of the fuel cell stack 1 is below the temperature of a freezing point.

In the foregoing fuel cell system 100, in order to prevent degradation of the fuel cells due to freezing of generated water that has attached to the electrolyte membranes after stopping the fuel cell stack 1, a drying operation for drying the electrolyte membranes is executed during processing for stopping the fuel cell stack 1. Therefore, at the time of reactivation of the fuel cell system, the electrolyte membranes are in a dry state.

Figure 3:
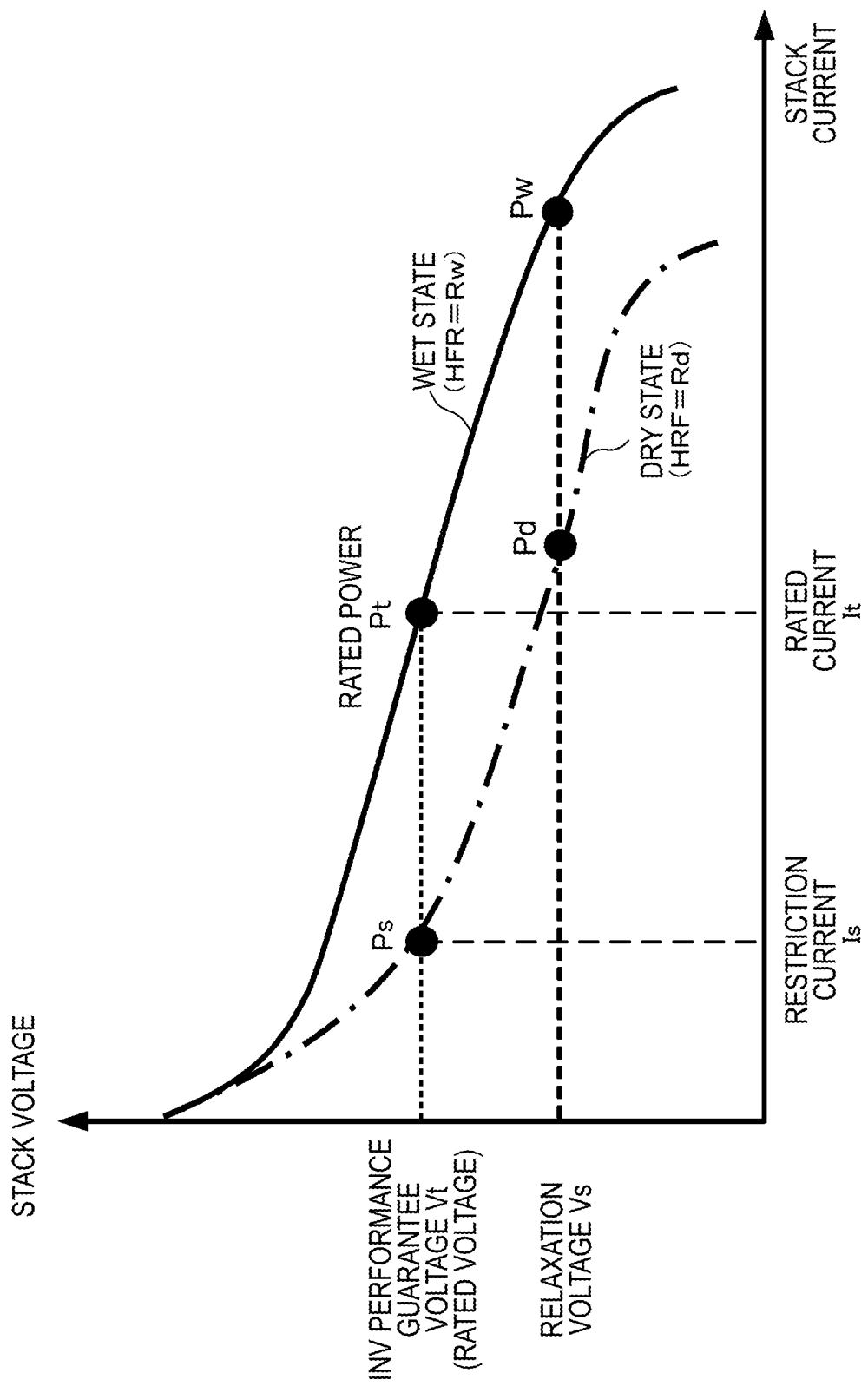
FIG. 3 shows an I-V characteristic that changes in accordance with a wet/dry state of a fuel cell stack.

FIG. 3 shows the I-V characteristics of the fuel cell stack 1 in a wet state and a dry state. In FIG. 3, a horizontal axis indicates output current of the fuel cell stack 1, whereas a vertical axis indicates output voltage of the fuel cell stack 1.

In FIG. 3, a solid line indicates the I-V characteristic exhibited when the electrolyte membranes of the fuel cell stack 1 are wet, that is, in the wet state, whereas a dash-and-dot line indicates the I-V characteristic exhibited when the electrolyte membranes of the fuel cell stack 1 are dry, that is, in the dry state. Herein, the HFR exhibited by the fuel cell stack 1 when the electrolyte membranes are in the wet state is noted as "Rw," whereas the HFR exhibited by the fuel cell stack 1 when the electrolyte membranes are in the dry state is noted as "Rd".

As shown in FIG. 3, when the fuel cell stack 1 is in the wet state, the fuel cell stack 1 supplies the rated power Vt to the driving motor 5 as soon as the stack voltage reaches the INV performance guarantee voltage Vt.

On the other hand, when the fuel cell stack 1 is in the dry state, the I-V characteristic is deteriorated compared with that in the wet state; hence, even if the stack voltage has been reduced to the INV performance guarantee voltage Vt, the fuel cell stack 1 does not supply the rated power Vt to the driving motor 5 due to the small stack current.

Therefore, when the motor requirement torque has increased with an increase in the depression amount of the accelerator pedal caused by an acceleration request from the driver, the stack voltage reaches the IV performance guarantee voltage Vt before generated power of the fuel cell stack 1 reaches the motor requirement power.

In this state, merely using power Ps generated under the IV performance guarantee voltage Vt does not supply sufficient power to driving motor 5. As a result, the vehicle is not sufficiently accelerated in response to the acceleration request from the driver, that is, the drivability is reduced.

Furthermore, as shown in FIG. 3, when the stack voltage is increased by the DC/DC converter 3 to prevent the stack voltage from falling below the INV performance guarantee voltage Vt, the stack current is restricted. In general, the smaller the stack current, the smaller the amount of water generated in the fuel cell stack 1 as indicated by the aforementioned electrode reactions (1) and (2). For this reason, while the stack current is restricted by maintaining the stack voltage at the INV performance guarantee voltage Vt, it takes time for the electrolyte membranes to shift from the dry state to the wet state.

Therefore, despite the acceleration request from the driver, the I-V characteristic of the fuel cell stack 1 does not recover immediately, even during the acceleration of the vehicle. Thus, the drivability is not improved.

In view of the above, in the present embodiment, when the fuel cell stack 1 has a poor power generation characteristic, voltage between the fuel cell stack 1 and the inverter 4 is reduced to fall below the INV performance guarantee voltage Vt so as to increase the stack current when power required by the driving motor 5 increases, for example, when accelerating the vehicle.

Figure 4:
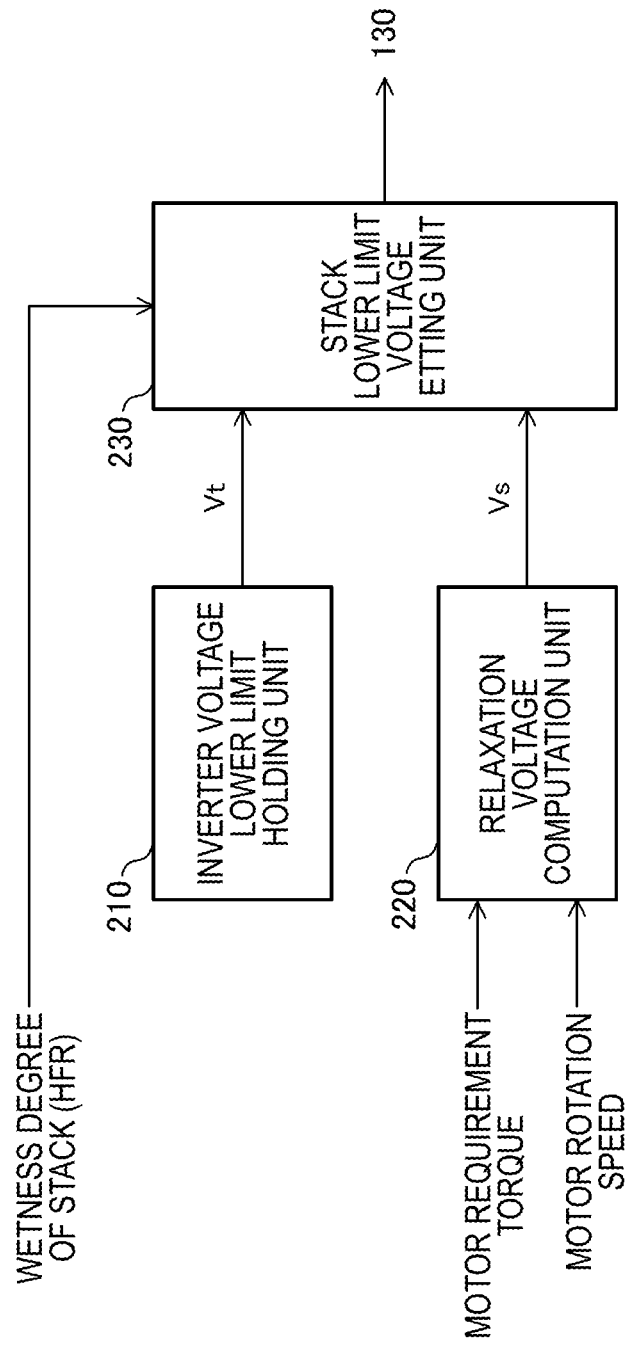
FIG. 4 is a block diagram showing a configuration for computing a lower limit voltage of the fuel cell stack.

FIG. 4 is a block diagram showing a detailed configuration of the stack lower limit voltage computation unit 200 according to the present embodiment.

The stack lower limit voltage computation unit 200 constitutes a lower limit voltage control unit that, with an increase in power required by the driving motor 5, controls the DC/DC converter 3 to cause voltage between the fuel cell stack 1 and the inverter 4 to fall below the INV performance guarantee voltage Vt, that is, the voltage lower limit of the inverter 4.

The stack lower limit voltage computation unit 200 includes an INV voltage lower limit holding unit 210, a relaxation voltage computation unit 220, and a stack lower limit voltage setting unit 230.

The INV voltage lower limit holding unit 210 holds the aforementioned INV performance guarantee voltage Vt. The INV performance guarantee voltage Vt is determined on the basis of the rated power Pt for the driving motor 5, and is preset in accordance with, for example, the conditions of use of the driving motor 5 and the power generation performance of the fuel cell stack 1.

For example, as shown in FIG. 3, the INV performance guarantee voltage Vt is set as a stack voltage that enables the fuel cell stack 1 to supply the rated power Pt, which is necessary for accelerating the driving motor 5, to the inverter 4 when the fuel cell stack 1 is in the wet state.

The relaxation voltage computation unit 220 computes a relaxation voltage Vs for relaxing the voltage restriction based on the INV performance guarantee voltage Vt. In the present embodiment, the relaxation voltage computation unit 220 calculates the relaxation voltage Vs, which is lower than the INV performance guarantee voltage Vt, on the basis of the motor requirement torque and motor rotation speed.

The stack lower limit voltage setting unit 230 sets a lower limit of the stack voltage controlled by the DC/DC converter 3. Hereinafter, the voltage lower limit set by the stack lower limit voltage setting unit 230 is referred to as the "stack lower limit voltage."

In the present embodiment, the stack lower limit voltage setting unit 230 determines whether the fuel cell stack 1 is in the dry state on the basis of the HFR measured by the internal resistance measuring apparatus 6.

When it is determined that the fuel cell stack 1 is in the wet state, the stack lower limit voltage setting unit 230 sets the INV performance guarantee voltage Vt as the stack lower limit voltage. On the other hand, when it is determined that the fuel cell stack 1 is in the dry state, the stack lower limit voltage setting unit 230 sets the relaxation voltage, which is lower than the INV performance guarantee voltage Vt, as the stack lower limit voltage.

Figure 5:
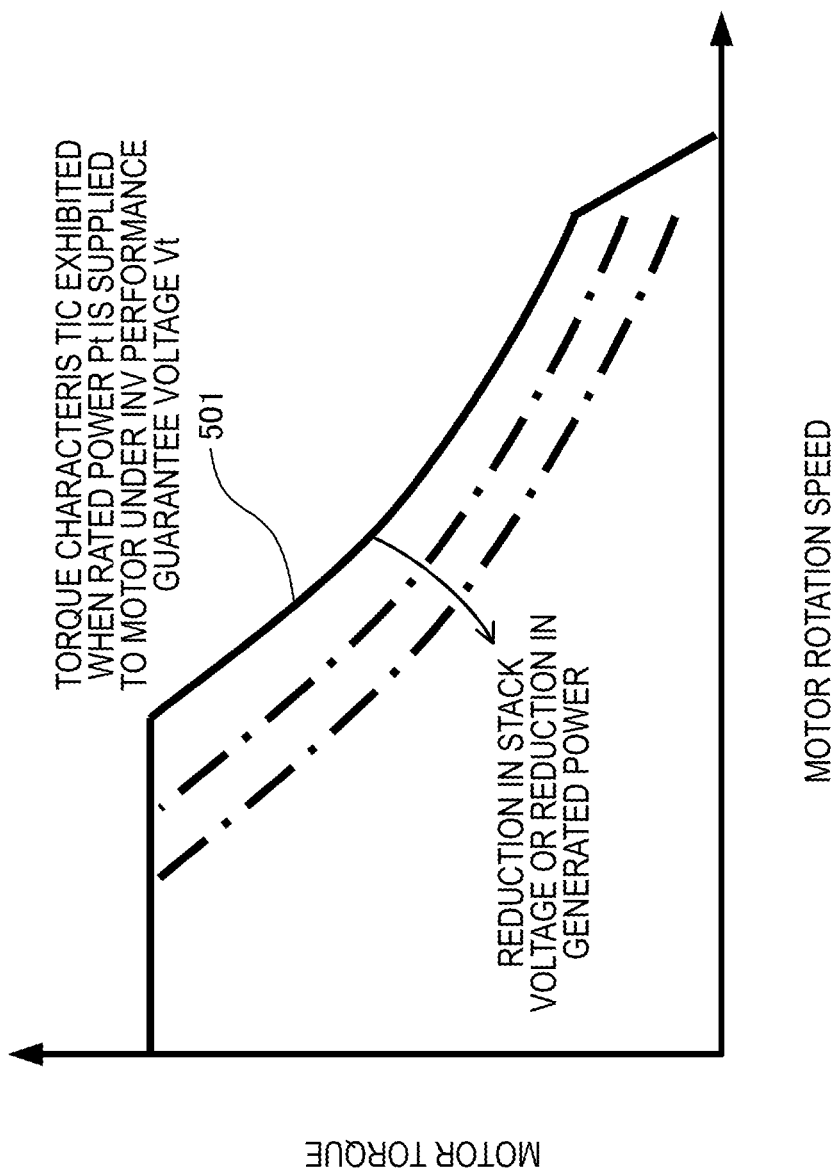
FIG. 5 shows a torque characteristic of a driving motor.

FIG. 5 shows a torque characteristic of the driving motor 5 in correspondence with a motor rotation speed. This torque characteristic changes in accordance with a reduction in the stack voltage. In FIG. 5, a horizontal axis indicates the motor rotation speed, whereas a vertical axis indicates the motor torque.

In FIG. 5, a solid line indicates a torque characteristic 501 exhibited when the rated power Pt is supplied to the driving motor 5 while the stack voltage is set to the INV performance guarantee voltage Vt.

In general, as indicated by dash-and-dot lines, the torque characteristic of the driving motor 5 deteriorates with a reduction in power supplied to the driving motor 5. Furthermore, even if power supplied to the driving motor 5 is constant, the torque characteristic deteriorates as the stack voltage falls below the INV performance guarantee voltage Vt.

Therefore, setting the relaxation voltage Vs to be excessively lower than the INV performance guarantee voltage Vt causes excessive deterioration in the torque characteristic. In this case, even if the driver issues an acceleration request to increase the motor requirement torque, the increased motor requirement torque cannot be achieved, and the drivability is significantly reduced.

Figure 6:
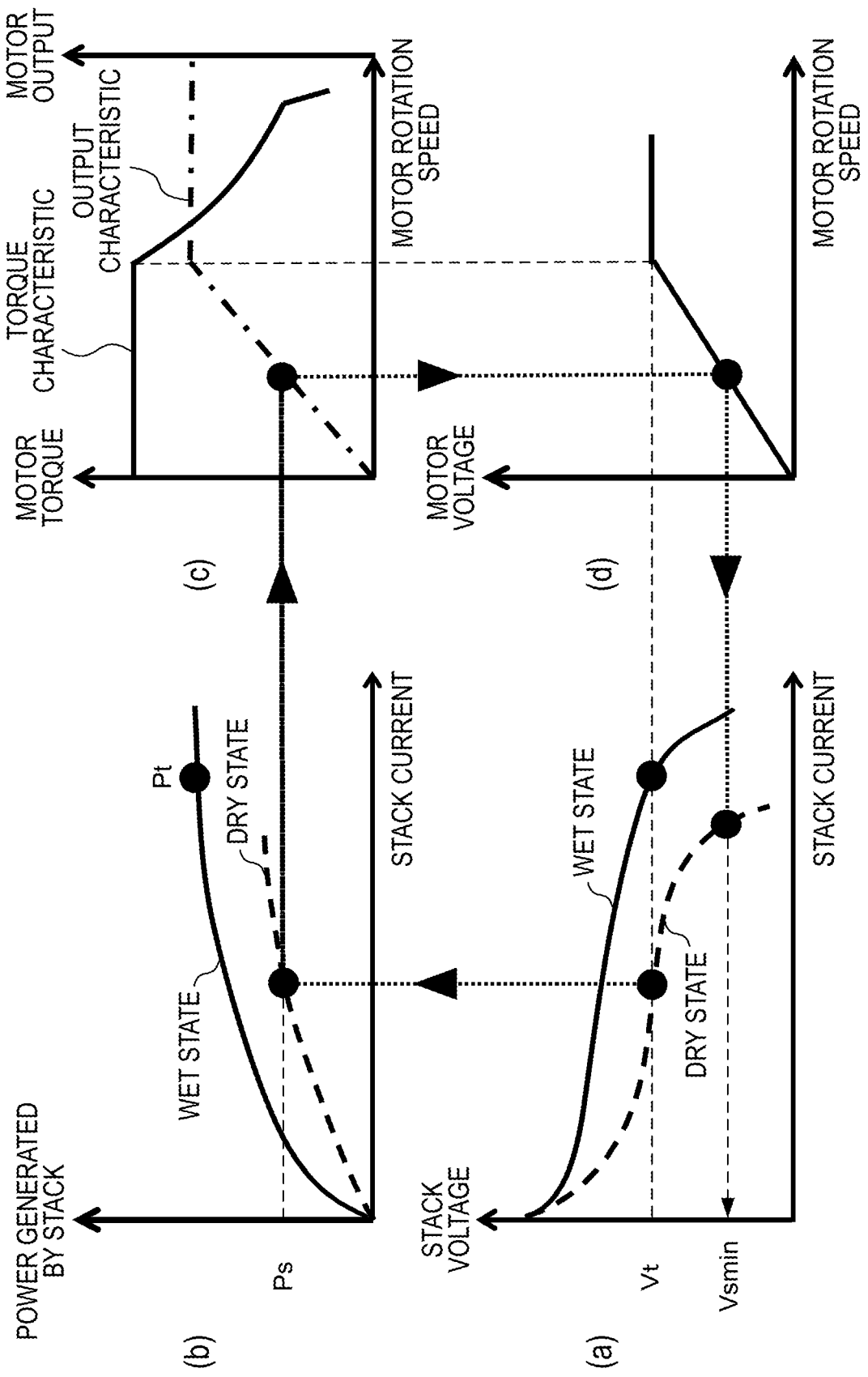
FIG. 6 shows a method of calculating relaxation voltage for relaxing the lower limit voltage of the fuel cell stack.

With reference to FIGS. 6(*a*) to 6(*d*), a description is now given of a method of setting a lower limit of the relaxation voltage Vs as a countermeasure against the foregoing issue.

FIGS. 6(*a*) to 6(*d*) show a method of computing a relaxation voltage lower limit Vsmin in the relaxation voltage computation unit 220.

FIG. 6(*a*) shows the I-V characteristics of the fuel cell stack 1 in the dry state and the wet state. FIG. 6(*b*) shows the characteristics of powers generated by the fuel cell stack 1 in the dry state and the wet state in correspondence with the stack current. In FIGS. 6(*a*) and 6(*b*), solid lines indicate the characteristics in the wet state, whereas dash lines indicate the characteristics in the dry state.

FIG. 6(*c*) shows the torque characteristic and the output characteristic of the driving motor 5 in correspondence with a rotation speed. In FIG. 6(*c*), a solid line indicates the torque characteristic, whereas a dash-and-dot line indicates the output characteristic. FIG. 6(*d*) shows a relationship between voltage of the driving motor 5 and a rotation speed of the driving motor 5.

When the DC/DC converter 3 maintains the stack voltage at the INV performance guarantee voltage Vt while the fuel cell stack 1 is in the dry state as indicated by the dash line in FIG. 6(*a*), power generated by the stack is restricted to power Ps as indicated by the dash line in FIG. 6(*b*).

As shown in FIG. 6(*c*), a rotation speed exhibited by the driving motor 5 when the fuel cell stack 1 supplies the restriction power Ps to the driving motor 5 is specified from the output characteristic of the driving motor 5. As shown in FIG. 6(*d*), voltage of the driving motor 5 is obtained from the specified rotation speed of the driving motor 5. As shown in FIG. 6(*a*), the lower limit Vsmin of the relaxation voltage is specified from the obtained voltage of the driving motor 5.

As described above, on the basis of the restriction power Ps exhibited when the stack voltage is restricted to the INV performance guarantee voltage Vt, the lower limit Vsmin of the relaxation voltage is set so that the shaft output of the driving motor 5 does not fall below the motor output under the restriction power Ps.

In this way, when accelerating the driving motor 5, the amount of water generated in the fuel cell stack 1 can be significantly increased without causing the output of the driving motor 5 to fall below the motor output exhibited when the stack voltage is restricted to the INV performance guarantee voltage Vt.

Therefore, humidification of the fuel cell stack 1 can be advanced without reducing the output of the driving motor 5 at the time of acceleration compared with a case where the INV performance guarantee voltage Vt is set as the stack lower limit voltage.

Figure 7:
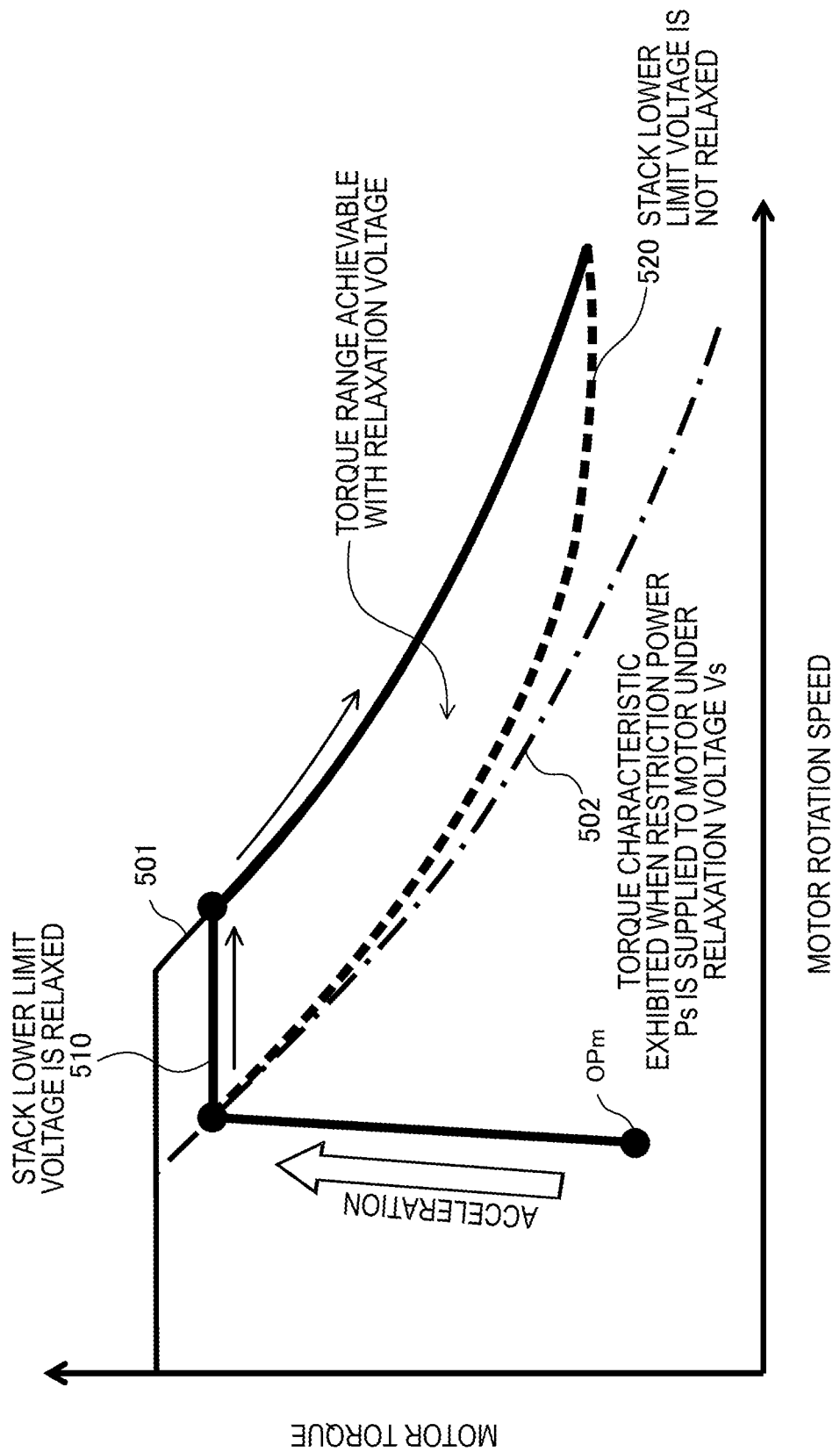
FIG. 7 is a conceptual diagram showing a torque range that can be achieved by reducing voltage of the fuel cell stack to the relaxation voltage.

FIG. 7 is a conceptual diagram showing an achievable motor torque range that is expanded by relaxing the stack lower limit voltage.

FIG. 7 shows the torque characteristic 501 shown in FIG. 5, a torque characteristic 502 exhibited when the restriction power Ps is supplied to the driving motor 5 while the stack voltage is set to the relaxation voltage Vs, an upper limit torque 510 exhibited when the stack lower limit voltage is relaxed, and an upper limit torque 520 exhibited when the stack lower limit voltage is not relaxed.

The torque characteristic 502 corresponds to a motor rotation speed exhibited when the fuel cell stack 1 supplies the restriction power Ps to the driving motor 5 while the relaxation voltage Vs is set is set between the fuel cell stack 1 and the inverter 4.

The upper limit torque 510 is an upper limit of the motor torque that can be achieved by reducing the stack voltage, which is supplied from the fuel cell stack 1 to the inverter 4, to the relaxation voltage Vs. The upper limit torque 520 is an upper limit of the motor torque that can be achieved by restricting the stack voltage to the INV performance guarantee voltage Vt.

As shown in FIG. 7, the motor requirement torque increases to the upper limit torque 520 in response to an acceleration request issued by the driver at an operation point OPm.

In this case, while the stack voltage is restricted to the INV performance guarantee voltage Vt, the amount of water generated in the fuel cell stack 1 is small because the stack current is restricted as shown in FIG. 3, and thus it takes time to shift from the dry state to the wet state. Therefore, with the upper limit torque 520, a shift from the torque characteristic 502 to the torque characteristic 501 is completed when the motor rotation speed exceeds the operation point OPm by a substantial amount.

On the other hand, in the present embodiment, the stack voltage is reduced to the relaxation voltage Vs, and thus the stack current increases, and so does the amount of generated water in the fuel cell stack 1. Accordingly, the fuel cell stack 1 shifts from the dry state to the wet state in a short period of time. That is, the upper limit torque 510 causes a substantially parallel shift to the torque characteristic 501 immediately after transition from the operation point OPm to the torque characteristic 502.

As described above, setting the relaxation voltage Vs as the stack lower limit voltage enables the fuel cell stack 1 to shift from the dry state to the wet state in a short period of time at the time of acceleration. This makes it possible to promptly expand a torque range that can achieve the motor requirement torque from a range under the upper limit torque 520 to a range under the upper limit torque 510.

Therefore, the power generation performance of the fuel cell stack 1 is improved in a short period of time during the acceleration of the vehicle. Thus, a reduction in the drivability during the acceleration can be promptly reversed.

A description is now given of the operations of the controller 7 according to the present embodiment with reference to the drawings.

Figure 8:
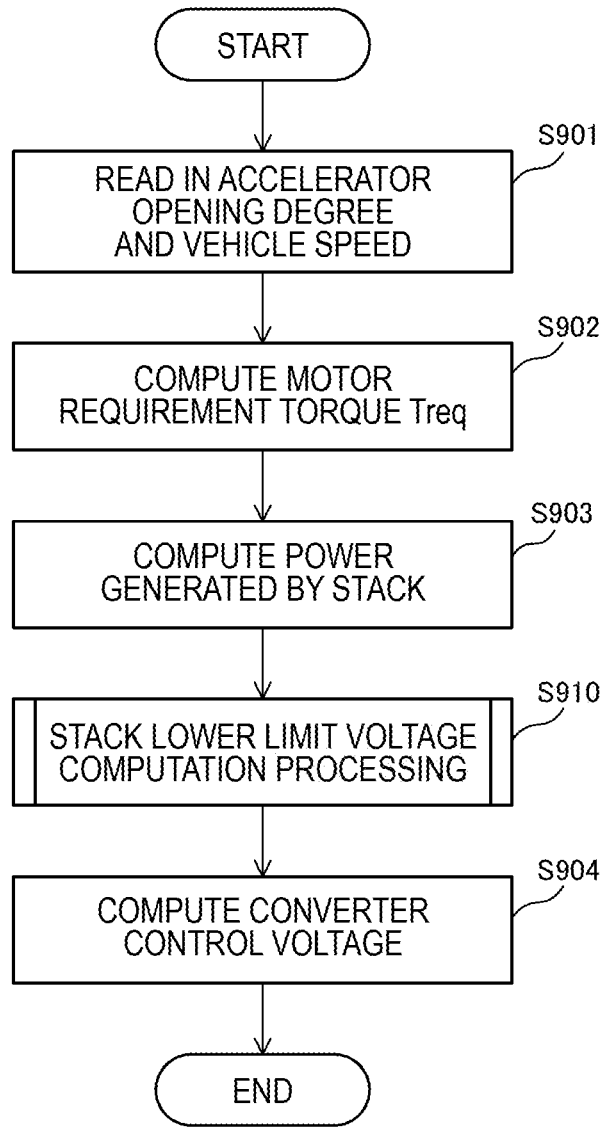
FIG. 8 is a flowchart of a control method for the fuel cell system according to the first embodiment.

FIG. 8 is a flowchart of a control method for the fuel cell system 100 according to the present embodiment.

In step S901, the motor requirement torque computation unit 110 of the controller 7 reads in an accelerator opening degree and a vehicle speed that are detected by the accelerator opening degree sensor 72 and the vehicle speed sensor 71, respectively.

In step S902, the motor requirement torque computation unit 110 refers to the prestored torque map after reading in the accelerator opening degree and the vehicle speed, and calculates a motor requirement torque Treq corresponding to an operation point specified by these accelerator opening degree and vehicle speed.

In step S903, the motor requirement power computation unit 120 of the controller 7 refers to the prestored requirement power map after obtaining the motor requirement torque, and calculates a motor requirement power corresponding to the obtained motor requirement torque Treq.

In step S910, the stack lower limit voltage computation unit 200 of the controller 7 executes stack lower limit voltage processing for setting the stack lower limit voltage. The stack lower limit voltage processing will be described later with reference to FIG. 9.

In step S904, the converter control voltage computation unit 130 of the controller 7 computes voltage of the DC/DC converter 3 at the fuel cell stack 1 side on the basis of the motor requirement power so that the voltage does not fall below the stack lower limit voltage.

In the present embodiment, the converter control voltage computation unit 130 reduces the voltage of the DC/DC converter 3 at the fuel cell stack 1 side so that power output from the fuel cell stack 1 matches the motor requirement power. When the voltage of the DC/DC converter 3 at the fuel cell stack 1 side has reached the stack lower limit voltage, the converter control voltage computation unit 130 restricts the voltage of the fuel cell stack 1 to the stack lower limit voltage.

Figure 9:
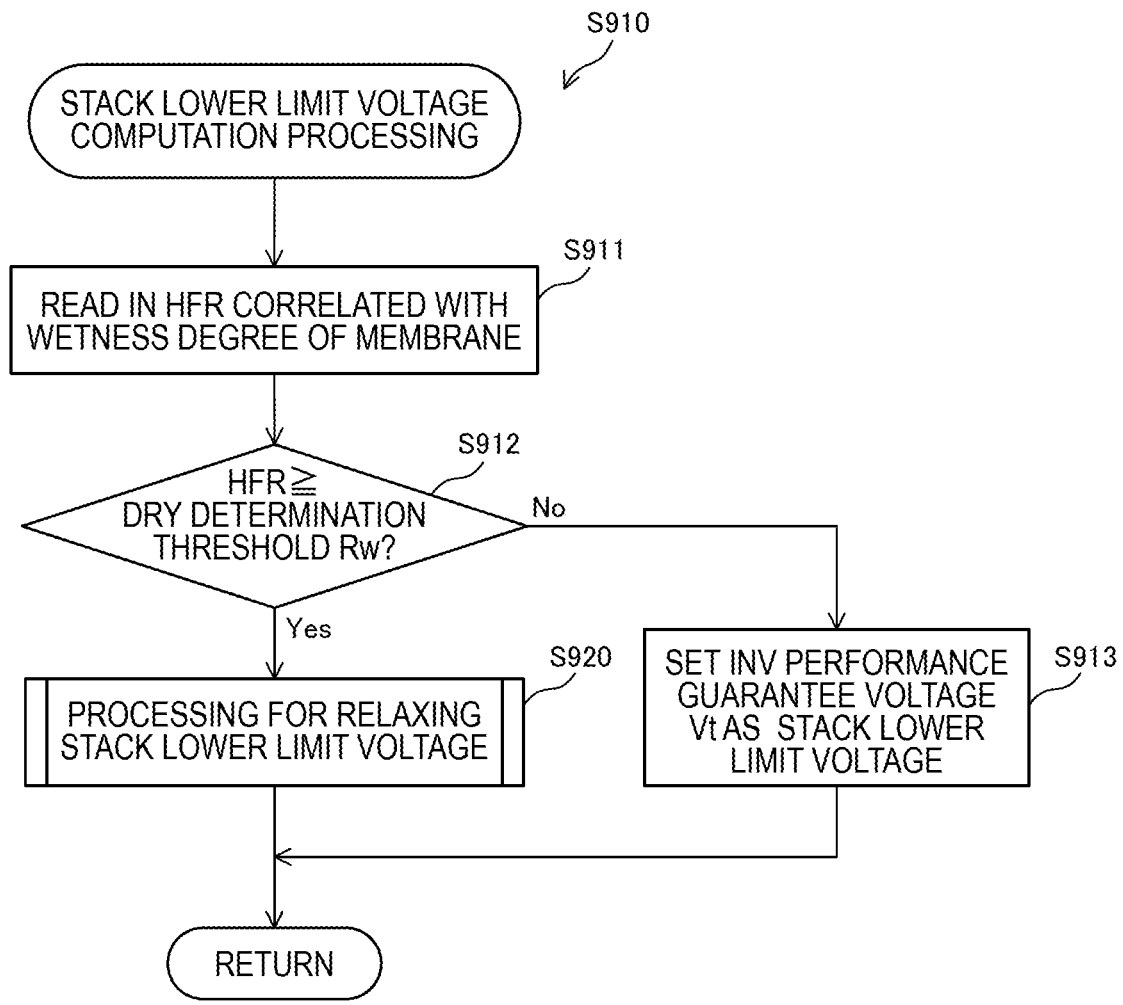
FIG. 9 is a flowchart of processing for computing the lower limit voltage of the fuel cell stack.

FIG. 9 is a flowchart of one example of the stack lower limit voltage processing executed in step S910.

In step S911, the stack lower limit voltage setting unit 230 of the stack lower limit voltage computation unit 200 reads in the HFR, which is correlated with a wetness degree of the electrolyte membranes of the fuel cell stack 1, from the internal resistance measuring apparatus 6. The higher the HFR of the fuel cell stack 1, the drier the electrolyte membranes. The lower the HFR of the fuel cell stack 1, the wetter the electrolyte membranes. Note that the temperature of the fuel cell stack 1, for example, may be used in place of the HFR as a parameter correlated with the wetness degree of the electrolyte membranes.

In step S912, the stack lower limit voltage setting unit 230 determines whether the HFR is equal to or higher than a dry determination threshold Rw. As indicated by the solid line in FIG. 3, the dry determination threshold Rw is set to an upper limit of the HFR in the wet state where the fuel cell stack 1 can supply the rated power for the driving motor 5 while the voltage of the fuel cell stack 1 is set to the INV performance guarantee voltage Vt.

If the HFR is equal to or higher than the dry determination threshold Rw, the stack lower limit voltage setting unit 230 of the controller 7 proceeds to step S920, determines that the INV performance guarantee voltage Vt would restrict the stack voltage at the time of acceleration, and executes processing for relaxing the stack lower limit voltage. The details of the stack lower limit voltage processing will be described later with reference to FIG. 10.

If the HFR is lower than the dry determination threshold Rw, the stack lower limit voltage setting unit 230 proceeds to step S913, determines that the fuel cell stack 1 is in a state where it can supply the rated power Pt to the driving motor 5, and sets the INV performance guarantee voltage Vt as the stack lower limit voltage. Thereafter, the present processing returns to the processing procedure of the control method for the fuel cell system 100 shown in FIG. 8.

Figure 10:
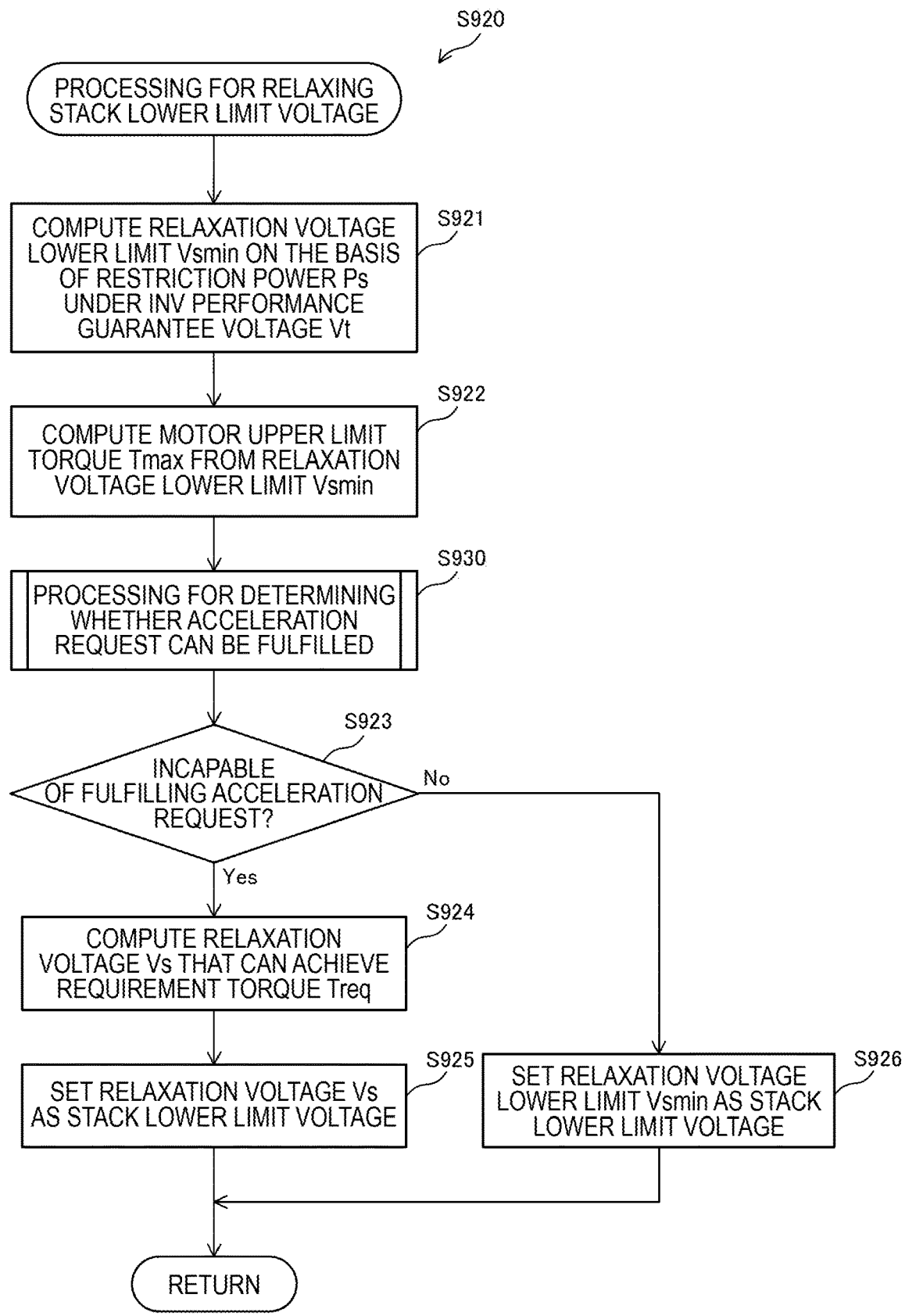
FIG. 10 is a flowchart of processing for relaxing the lower limit voltage of the fuel cell stack.

FIG. 10 is a flowchart of one example of the processing executed in step S920, that is, the processing for relaxing the stack lower limit voltage.

In step S921, the relaxation voltage computation unit 220 of the stack lower limit voltage computation unit 200 computes the relaxation voltage lower limit Vsmin on the basis of the restriction power Ps under the INV performance guarantee voltage Vt.

In the present embodiment, as shown in FIGS. 6(a) and 6(b), I-V characteristics are prestored in the relaxation voltage computation unit 220 in one-to-one correspondence with HFRs of the fuel cell stack 1. The relaxation voltage computation unit 220 obtains a stack current under the INV performance guarantee voltage Vt with reference to the I-V characteristic specified by the current HFR, and calculates the restriction power Ps by multiplying the obtained stack current by the INV performance guarantee voltage Vt.

The relaxation voltage computation unit 220 may estimate the I-V characteristic using the stack current sensor 11 and the stack voltage sensor 12, and calculate the restriction power Ps by obtaining a stack current under the INV performance guarantee voltage Vt on the basis of the estimated I-V characteristic.

Furthermore, as shown in FIGS. 6(c) and 6(d), output characteristics and voltage characteristics of the driving motor 5 are prestored in the relaxation voltage computation unit 220 in correspondence with motor rotation speeds. The relaxation voltage computation unit 220 obtains a motor rotation speed under the restriction power Ps with reference to the output characteristic of the driving motor 5, and specifies a motor voltage from the obtained motor rotation speed with reference to the voltage characteristic of the driving motor 5.

The relaxation voltage computation unit 220 converts the specified motor voltage into voltage of the inverter 4, and calculates the converted voltage of the inverter 4 as the relaxation voltage lower limit Vsmin of the fuel cell stack 1.

By thus determining the relaxation voltage lower limit Vsmin, the stack current can be increased to advance humidification of the fuel cell stack 1 without causing the generated power to fall below the restriction power Ps exhibited when the stack voltage is restricted to the INV performance guarantee voltage Vt.

In step S922, the relaxation voltage computation unit 220 computes a motor upper limit torque Tmax using, for example, a preset map on the basis of the relaxation voltage lower limit Vsmin. As a result, the upper limit torque 520 indicated by the broken line in FIG. 7 is obtained.

In step S930, the relaxation voltage computation unit 220 executes processing for determining whether the motor requirement torque Treq can be achieved while the stack voltage is set to the relaxation voltage lower limit Vsim. The details of this processing will be described later with reference to FIG. 11.

In step S923, if the relaxation voltage computation unit 220 determines that the acceleration request cannot be fulfilled by setting the stack voltage to the relaxation voltage lower limit Vsmin, it proceeds to step S924; on the other hand, if it determines that the acceleration request can be fulfilled, it proceeds to step S926.

In step S924, as the relaxation voltage computation unit 220 has determined that the acceleration request cannot be fulfilled with the relaxation voltage lower limit Vsmin, it computes a relaxation voltage Vs that can achieve the motor requirement torque Treq.

In the present embodiment, the relaxation voltage computation unit 220 refers to a preset relaxation voltage map, and computes the relaxation voltage Vs on the basis of the motor requirement torque Treq and the current motor rotation speed detected by the motor rotation speed sensor 51. The details of the relaxation voltage map will be described later with reference to FIG. 12.

In step S925, the stack lower limit voltage setting unit 230 sets the relaxation voltage Vs that can achieve the motor requirement torque as the stack lower limit voltage.

In step S926, as the acceleration request can be fulfilled with the output equivalent to the motor output under the restriction power Ps, the stack lower limit voltage setting unit 230 sets the relaxation voltage lower limit Vsmin as the stack lower limit voltage. Upon completion of the process of step S925 or S926, the processing for relaxing the stack lower limit voltage is ended, and the processing of FIG. 9 is resumed.

Figure 11:
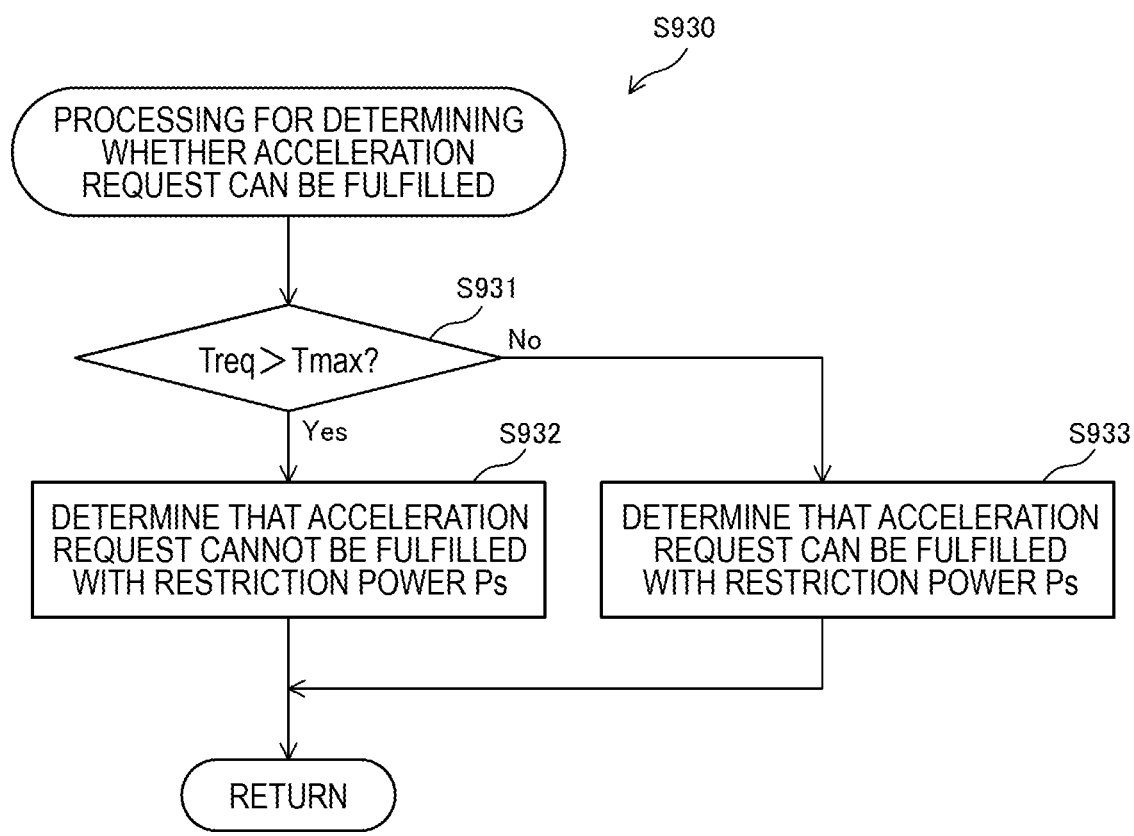
FIG. 11 is a flowchart of processing for determining whether an acceleration request from a driver can be fulfilled.

FIG. 11 shows one example of the processing executed in step S930, that is, the processing for determining whether the acceleration request can be fulfilled.

In step S931, the relaxation voltage computation unit 220 determines whether the motor requirement torque Treq is larger than the motor upper limit torque Tmax that is set on the basis of the relaxation voltage lower limit Vsmin.

If the motor requirement torque Treq is larger than the motor upper limit torque Tmax, the relaxation voltage computation unit 220 proceeds to step S932 and determines that the acceleration request cannot be fulfilled with the motor output under the restriction power Ps.

If the motor requirement torque Treq is equal to or smaller than the motor upper limit torque Tmax, the relaxation voltage computation unit 220 proceeds to step S933 and determines that the acceleration request can be fulfilled with the motor output under the restriction power Ps. Upon completion of the processes of steps S932 and S933, the processing for determining whether the acceleration request can be fulfilled is ended, and the processing of FIG. 10 is resumed.

Figure 12:
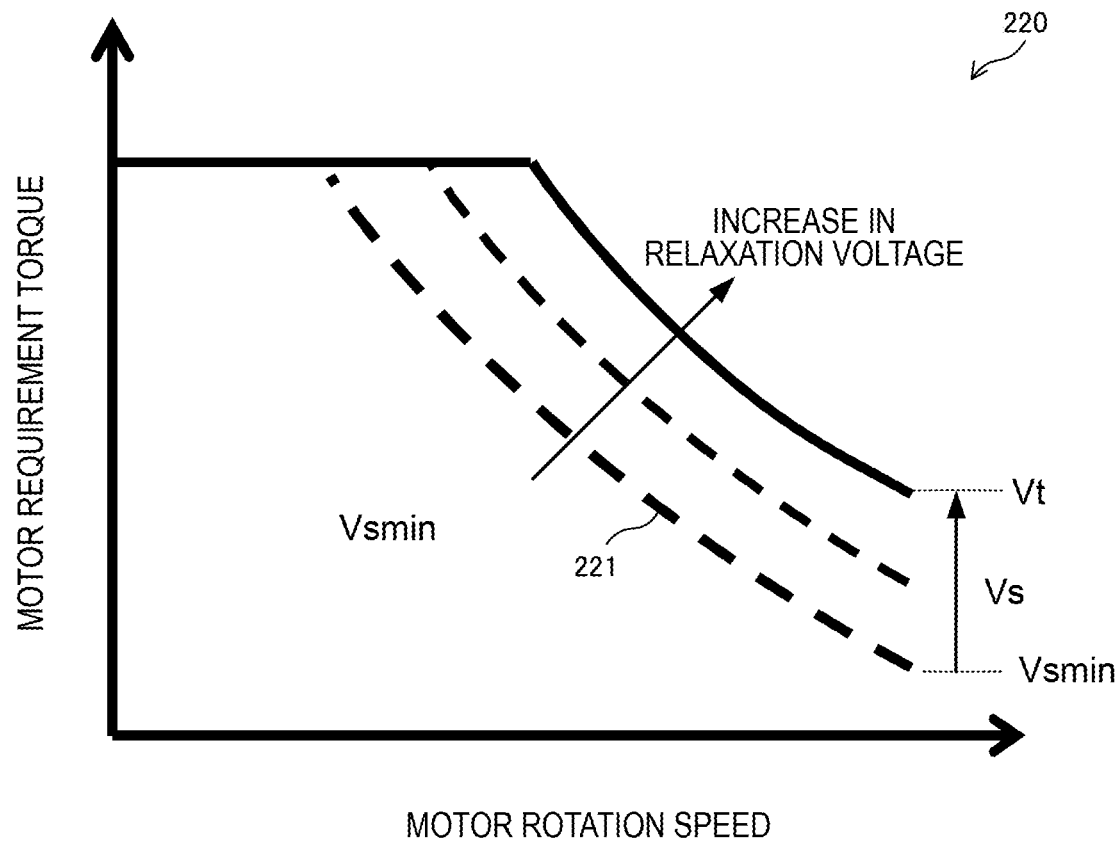
FIG. 12 shows a map used to set the relaxation voltage lower than an INV performance guarantee voltage.

FIG. 12 is a conceptual diagram showing one example of a relaxation voltage map stored in the relaxation voltage computation unit 220. In FIG. 12, a horizontal axis indicates a motor rotation speed, whereas a vertical axis indicates a motor requirement torque.

As shown in FIG. 12, in an operation range within an upper limit torque 221 based on the relaxation voltage lower limit Vsmin, the relaxation voltage lower limit Vsmin is set as the stack lower limit voltage. As the motor requirement torque becomes large compared with the upper limit torque 221, a value Vs larger than the relaxation voltage lower limit Vsim is set as the stack lower limit voltage.

As described above, when the fuel cell stack 1 is in the dry state, the stack lower limit voltage computation unit 200 outputs the relaxation voltage Vs lower than the INV performance guarantee voltage Vt as the stack lower limit voltage to the converter control voltage computation unit 130.

Specifically, the relaxation voltage computation unit 220 obtains the relaxation voltage lower limit Vsmin on the basis of the motor output under the INV performance guarantee voltage Vt, and increases the relaxation voltage Vs only when an acceleration request from the driver cannot be fulfilled with the obtained relaxation voltage lower limit Vsmin.

In this way, the stack current can be increased while suppressing a reduction in the output from the driving motor 5 compared with a case where the stack voltage is restricted to the INV performance guarantee voltage Vt. Therefore, the fuel cell stack 1 can promptly shift to the wet state while suppressing a reduction in the drivability during the acceleration.

With reference to the drawings, the following describes a method of setting the relaxation voltage Vs when an acceleration request received from the driver cannot be fulfilled with the relaxation voltage lower limit Vsmin.

Figure 13:
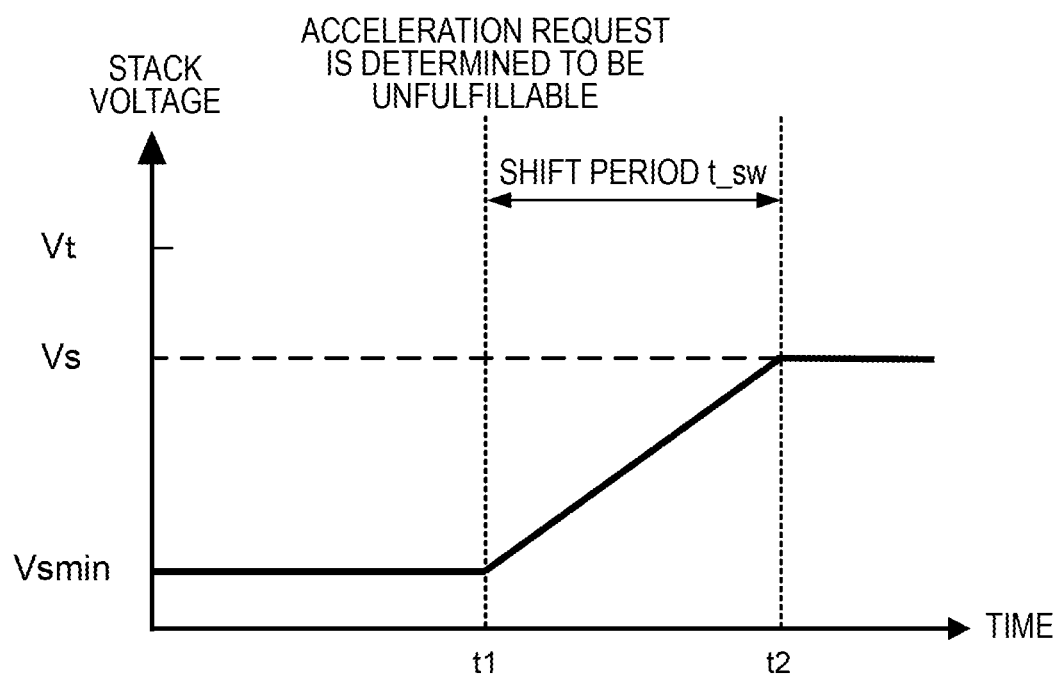
FIG. 13 is a time chart showing a method of shifting from a lower limit of the relaxation voltage to a voltage that can achieve a motor requirement torque.

FIG. 13 is a time chart showing one example of a method of shifting from the relaxation voltage lower limit Vsmin to the relaxation voltage Vs.

Prior to time t1, the motor requirement torque Treq is smaller than the motor upper limit torque Tmax, and the relaxation voltage lower limit Vsmin is set as the stack lower limit voltage.

At time t1, the driver issues an acceleration request by increasing the depression amount of the accelerator pedal, and the motor requirement torque Treq exceeds the motor upper limit torque Tmax. Accordingly, the relaxation voltage computation unit 220 determines that the acceleration request from the driver cannot be fulfilled, refers to the relaxation voltage map shown in FIG. 12, and calculates the relaxation voltage Vs corresponding to an operation point specified by the motor requirement torque Treq and the motor rotation speed.

Then, in order to switch to the relaxation voltage Vs, the relaxation voltage computation unit 220 takes a preset shift period t_sw to monotonically increase the stack lower limit voltage from the relaxation voltage lower limit Vsmin. By thus increasing the relaxation voltage gradually, the upper limit of torque that can be output from the driving motor 5 can be increased while advancing humidification of the fuel cell stack 1.

At time t2, that is, when the shift period t_sw has elapsed since time t1, the increased stack lower limit voltage reaches the relaxation voltage Vs. Accordingly, the motor requirement torque Treq can be achieved. In this way, a reduction in the drivability can be suppressed while securing the amount of water generated in the fuel cell stack 1.

By thus setting the shift period t_sw, an acceleration request can be fulfilled while suppressing a sudden fluctuation in the output from the driving motor 5 associated with the acceleration request. Consequently, the drivability is improved.

A description is now given of the operations of the fuel cell system 100 when the processing for relaxing the stack lower limit voltage according to the present embodiment has been executed.

Figure 14:
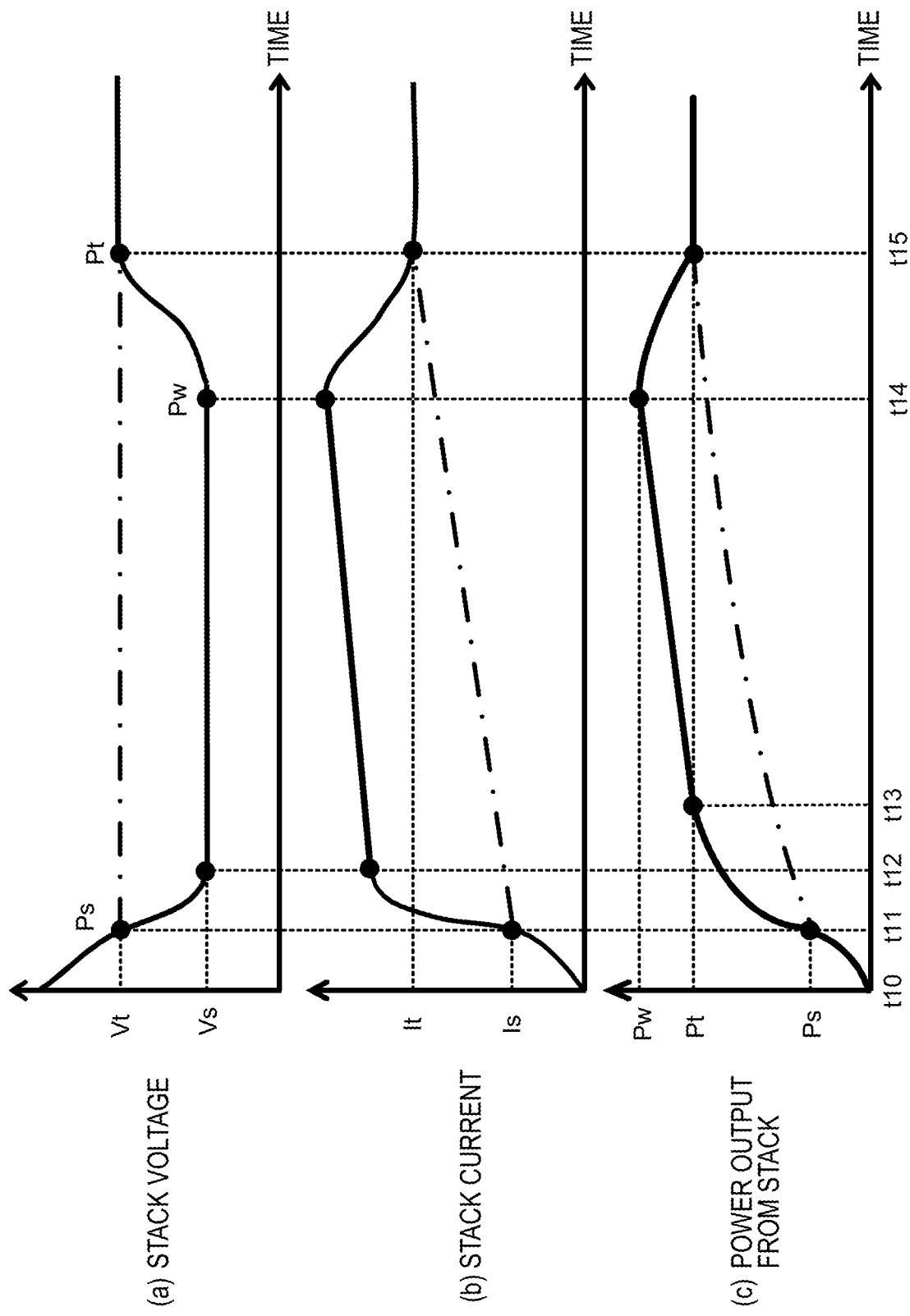
FIG. 14 is time charts each showing a change in the power generation performance of the fuel cell stack when voltage of the fuel cell stack has been reduced to the relaxation voltage during the acceleration of a vehicle.

FIG. 14 is time charts each showing a change in the state of the fuel cell stack 1 when the relaxation voltage Vs is set as the stack lower limit voltage.

FIG. 14(*a*) shows a change in the stack voltage detected by the stack voltage sensor 12. FIG. 14(*b*) shows a change in the stack current detected by the stack current sensor 11. FIG. 14(*c*) shows a change in power output from the fuel cell stack 1 on the basis of the stack voltage and the stack current.

Horizontal axes in FIGS. 14(*a*) to 14(*c*) represent a common time axis. In each of these figures, a solid line indicates a state where the relaxation voltage Vs is set as the stack lower limit voltage, whereas a dash-and-dot line indicates a state where, instead of the relaxation voltage Vs, the INV performance guarantee voltage Vt is set as the stack lower limit voltage.

At time t10, the fuel cell system 100 is activated. At this time, as the fuel cell stack 1 is in the dry state, the relaxation voltage Vt that can achieve the motor requirement torque on the basis of an acceleration request from the driver is set as the stack lower limit voltage.

In response to the acceleration request from the driver, the DC/DC converter 3 reduces the stack voltage as shown in FIG. 14(a), and the stack current consequently increases as shown in FIG. 14(b). As a result, the power output from the stack increases as shown in FIG. 14(c).

At time t11, the reduced stack voltage reaches the INV performance guarantee voltage Vt. At this time, due to a poor I-V characteristic, the stack current is restricted to a value Is that is smaller than a rated current It as shown in FIG. 14(b).

When the stack voltage is restricted to the INV performance guarantee voltage Vt, a small stack current is maintained as indicated by the dash-and-dot line in FIG. 14(b), and thus it takes time for the fuel cell stack 1 to enter the wet state with the aid of generated water. This leads to a delay in recovery of the I-V characteristic. That is, the power output from the stack gradually increases as indicated by the dash-and-dot line in FIG. 14(c).

On the other hand, relaxing the stack lower limit voltage using the relaxation voltage Vs causes the stack voltage to fall below the INV performance guarantee voltage Vt as shown in FIG. 14(a).

At time t12, the reduced stack voltage reaches the relaxation voltage Vs, and the stack current exhibits a significant increase from a restriction current Is to the point where it exceeds the rated current It as shown in FIG. 14(b). As a large amount of water is consequently generated in the fuel cell stack 1, the I-V characteristic recovers promptly, and the power output from the stack increases quickly compared with a case where the stack voltage is maintained at the INV performance guarantee voltage Vt as shown in FIG. 14(c). Note that a period from time t1 to time t2 is approximately one second.

At time t13, the power output from the stack reaches the rated power Pt for the driving motor 5 as shown in FIG. 14(c). Thereafter, as a high stack current is maintained as shown in FIG. 14(b), a large amount of generated water places the electrolyte membranes of the fuel cell stack 1 in a wetter state, thereby further improving the I-V characteristic. Therefore, the power output from the stack gradually increases as shown in FIG. 14(c).

At time t14, the HFR of the fuel cell stack 1 falls below the wet state Rw shown in FIG. 3, and the relaxation voltage computation unit 220 executes processing for reverting the stack lower limit voltage from the relaxation voltage Vs to the INV performance guarantee voltage Vt. Here, a predetermined shift period is set to gradually increase the stack lower limit voltage, similarly to the shift method shown in FIG. 13.

At time t15, the stack lower limit voltage reverts to the INV performance guarantee voltage Vt as shown in FIG. 14(a), and the processing for reverting the stack lower limit voltage is ended.

As described above, by setting the relaxation voltage Vs that is lower than the INV performance guarantee voltage Vt as the stack lower limit voltage, a large amount of water is generated due to a significant increase in the stack current, thereby enabling the fuel cell stack 1 to supply the rated power Pt in an extremely short period of time.

The foregoing present embodiment has provided an example in which the fuel cell stack 1 supplies power to the driving motor 5. However, when the driving motor 5 is started, the battery 2 also supplies power to the driving motor 5 to secure the responsiveness of the driving motor 5 as shown in FIG. 15.

Figure 15:
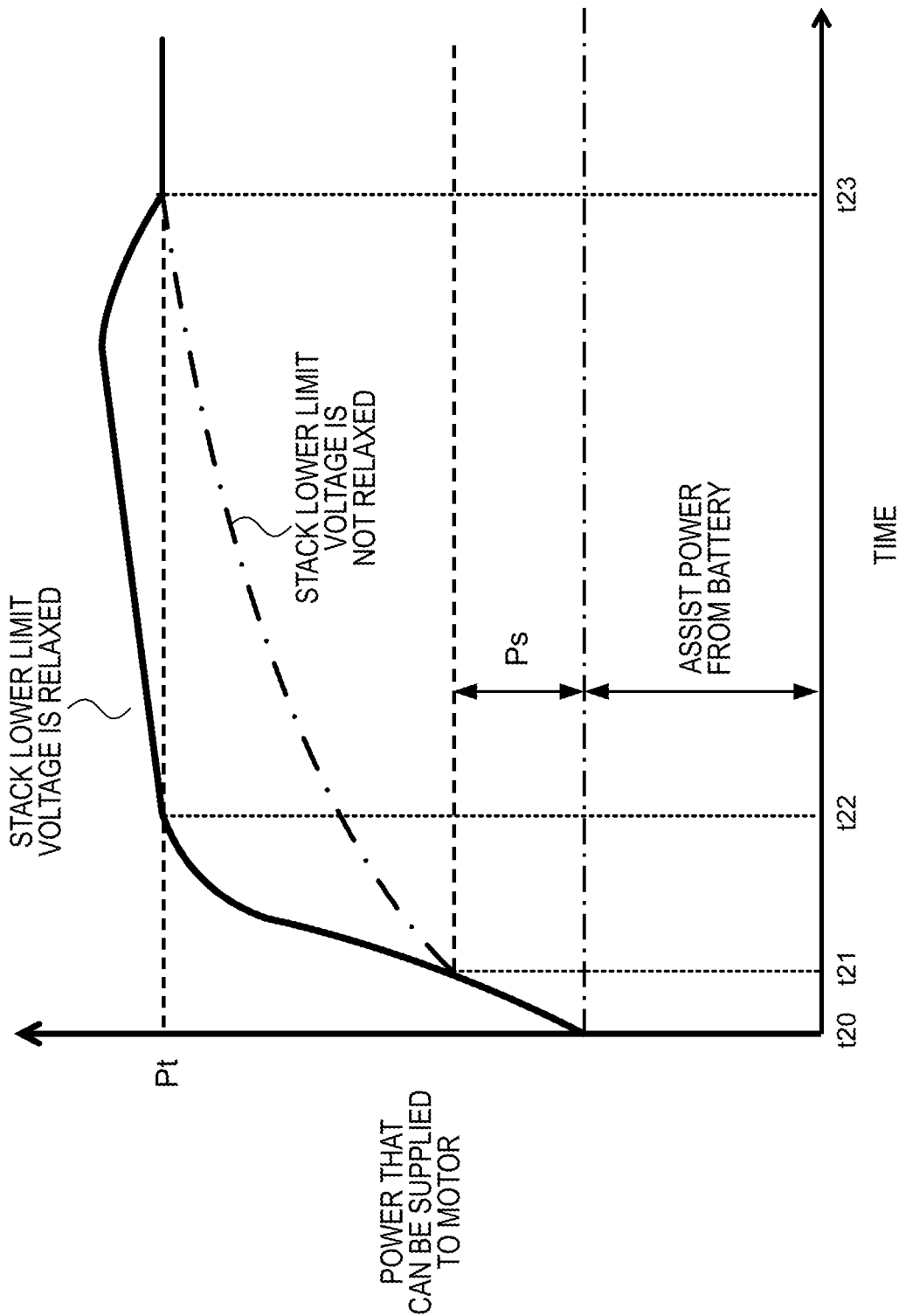
FIG. 15 is a time chart showing power that can be supplied to the driving motor when the battery is used to assist the power generation of the fuel cell stack.

FIG. 15 shows power that can be supplied by the fuel cell system 100 when the stack lower limit voltage has been relaxed in a case where the battery 2 is used to assist the fuel cell stack 1.

In FIG. 15, a horizontal axis indicates time, whereas a vertical axis indicates power that the fuel cell system 100 can supply to the driving motor 5. Furthermore, a solid line indicates power exhibited when the relaxation voltage Vs is set as the stack lower limit voltage, whereas a dash-and-dot line indicates power exhibited when the INV performance guarantee voltage Vt is set as the stack lower limit voltage.

At time t20, the driving motor 5 is started, and the DC/DC converter 3 causes discharge of assist power from the battery 2 to the driving motor 5, and reduces the stack voltage to gradually output generated power from the fuel cell stack 1 to the driving motor 5. By thus using the battery 2 to assist power generation of the fuel cell stack 1, the responsiveness of the driving motor 5 can be secured.

At time t21, the stack voltage reaches the INV performance guarantee voltage Vt, and the fuel cell stack 1 outputs the restriction power Ps. At this time, as the fuel cell stack 1 is in the dry state, the stack voltage is reduced to the relaxation voltage Vs. As a result, the stack current increases, and a large amount of water is generated in the fuel cell stack 1.

Accordingly, the electrolyte membranes of the fuel cell stack 1 are humidified quickly. Therefore, the I-V characteristic recovers, resulting in a prompt increase in generated power of the fuel cell stack 1. Then, at time t22, the rated power Pt can be supplied to the driving motor 5.

Furthermore, as a period required for the recovery of the I-V characteristic is shortened, an increase in the amount of discharge from the battery 2 associated with insufficient power generation of the fuel cell stack 1 can be suppressed. This can prevent overdischarge from the battery 2.

According to the first embodiment of the present invention, the fuel cell system 100 includes the fuel cell stack 1, the battery 2, and the inverter 4 that converts power output from the fuel cell stack 1 into alternating-current power and supplies the alternating-current power to the driving motor 5. The fuel cell system 100 also includes the converter 3 that controls voltage between the fuel cell stack 1 and the inverter 4 using power output from the battery 2.

The fuel cell system 100 further includes the converter control voltage computation unit 130 and the stack lower limit voltage computation unit 200.

The converter control voltage computation unit 130 controls the converter 3 so that the voltage between the fuel cell stack 1 and the inverter 4 does not fall below the INV performance guarantee voltage Vt, which is the voltage lower limit of the inverter 4.

When power required by the driving motor 5 increases, for example, when the driver has depressed the accelerator pedal, the stack lower limit voltage computation unit 200 causes the voltage between the fuel cell stack 1 and the inverter 4 to fall below the INV performance guarantee voltage Vt.

In this way, when the power required by the driving motor 5 increases in response to, for example, an acceleration request, current extracted from the fuel cell stack 1 increases, and a large amount of water is generated in the fuel cell stack 1. This enables the electrolyte membranes of the fuel cell stack 1 to promptly shift to the wet state. As a result, the power generation performance of the fuel cell stack 1 is improved, and a reduction in the driving performance (drivability) of the vehicle associated with a reduction in the I-V characteristic can be reversed during an acceleration operation.

It is also possible to prevent extraction of an excessive amount of discharged power from the battery 2 to the inverter 4 via the DC/DC converter 3 in association with a reduction in generated power of the fuel cell stack 1.

Furthermore, in the present embodiment, when the electrolyte membranes of the fuel cell stack 1 are wet, the stack lower limit voltage computation unit 200 restricts the act of reducing the voltage between the fuel cell stack 1 and the inverter 4 below the INV performance guarantee voltage Vt. Herein, the voltage between the fuel cell stack 1 and the inverter 4 is simply referred to as "stack voltage."

Specifically, as shown in FIG. 3, in the wet state Rw where the rated power Pt can be supplied to the driving motor 5 when the stack voltage has been reduced to the INV performance guarantee voltage Vt, the stack voltage is controlled so as not to fall below the INV performance guarantee voltage Vt.

If the stack voltage is reduced in a situation where it is not necessary to reduce the stack voltage, the torque of the driving motor 5 is reduced as shown in FIG. 4, thereby reducing the drivability. In view of this, when the electrolyte membranes of the fuel cell stack 1 are in the wet state, a reduction in the stack lower limit voltage is prohibited to suppress an unnecessary reduction in the drivability.

Furthermore, in the present embodiment, the relaxation voltage computation unit 220 refers to the relaxation voltage map shown in FIG. 12, and calculates the relaxation voltage Vs that is lower than the INV performance guarantee voltage Vt and capable of achieving the motor requirement torque without reducing the motor rotation speed during the acceleration. Then, the lower limit voltage setting unit 230 sets the relaxation voltage Vs as the stack lower limit voltage.

This makes it possible to achieve the motor requirement torque when the power required by the driving motor 5 has increased. Therefore, a reduction in the drivability can be suppressed while advancing humidification of the fuel cell stack 1.

Furthermore, in the present embodiment, as shown in FIGS. 6(a) to 6(d), the relaxation voltage computation unit 220 calculates the relaxation voltage lower limit Vsmin on the basis of output produced by the driving motor 5 while the stack voltage is maintained so as not to fall below the INV performance guarantee voltage Vt.

This enables the fuel cell stack 1 to rapidly shift to the wet state without excessively restricting the torque of the driving motor 5 compared with a case where restriction is applied using the INV performance guarantee voltage Vt.

Furthermore, in the present embodiment, as shown in FIG. 10, when the power required by the driving motor 5 increases, the stack lower limit voltage setting unit 230 prohibits the act of reducing the stack lower limit voltage to the relaxation voltage lower limit Vsmin if the motor output is reduced compared with a case where the stack voltage is maintained at the INV performance guarantee voltage Vt.

This can prevent a situation where more restriction is placed on the torque of the driving motor 5 than in a case where restriction is applied using the INV performance guarantee voltage Vt. Therefore, a reduction in the drivability can be suppressed.

Note that if the output from the driving motor 5 falls below the motor output exhibited while the stack voltage is maintained at the INV performance guarantee voltage Vt, the stack lower limit voltage setting unit 230 may set the stack voltage to the INV performance guarantee voltage Vt instead of reducing the stack voltage. In this way, a reduction in the drivability can be suppressed with a simple configuration while suppressing the computation load.

Furthermore, in the present embodiment, as shown in FIG. 14(a), the stack lower limit voltage computation unit 200 gradually increases the voltage between the fuel cell stack 1 and the inverter 4 after causing the stack voltage to fall below the INV performance guarantee voltage Vt. This can increase the upper limit torque of the driving motor 5 while humidifying the electrolyte membranes of the fuel cell stack 1.

Furthermore, after causing the stack voltage to fall below the INV performance guarantee voltage Vt, the stack lower limit voltage computation unit 200 takes the predetermined shift period t_sw to revert the stack voltage to the INV performance guarantee voltage Vt. In this way, the drivability can be improved with a simple control configuration. Note that the stack lower limit voltage computation unit 200 may revert the stack lower limit voltage at a predetermined temporal change rate.

Furthermore, in the present embodiment, as shown in FIG. 9, the stack lower limit voltage setting unit 230 switches the stack lower limit voltage to the INV performance guarantee voltage Vt in accordance with the wet/dry state of the fuel cell stack 1. The HFR is used to indicate the wet/dry state of the fuel cell stack 1.

Note that the fuel cell system 100 may include a sensor that measures the humidity of gas discharged from the fuel cell stack 1, and the stack lower limit voltage may be reverted to the INV performance guarantee voltage Vt in accordance with a detected value output from that sensor.

Alternatively, the stack lower limit voltage setting unit 230 may estimate the I-V characteristic of the fuel cell stack 1, and the stack lower limit voltage may be reverted to the INV performance guarantee voltage Vt on the basis of the estimated I-V characteristic.

By thus reverting the stack lower limit voltage upon recovery of the power generation characteristic of the fuel cell stack 1, a reduction in the torque of the driving motor 5 and excessive extraction of current from the fuel cell stack 1 can be prevented. That is, power output from the fuel cell stack 1 can be reliably secured, and the fuel cell stack 1 can be protected.

Furthermore, in the present embodiment, as shown in FIG. 13, when the relaxation voltage Vs that achieves the motor requirement torque in response to an acceleration request exceeds the relaxation voltage lower limit Vsmin, the stack lower limit voltage computation unit 200 gradually increases the stack lower limit voltage to the relaxation voltage Vs.

In this way, the acceleration request from the driver can be fulfilled while suppressing a sudden fluctuation in the torque of the driving motor 5. As a result, the drivability can be secured during the acceleration.

Second Embodiment

The following describes a shift method of reverting the stack lower limit voltage from the relaxation voltage Vs to the INV performance guarantee voltage Vt with reference to the drawings.

Figure 16:
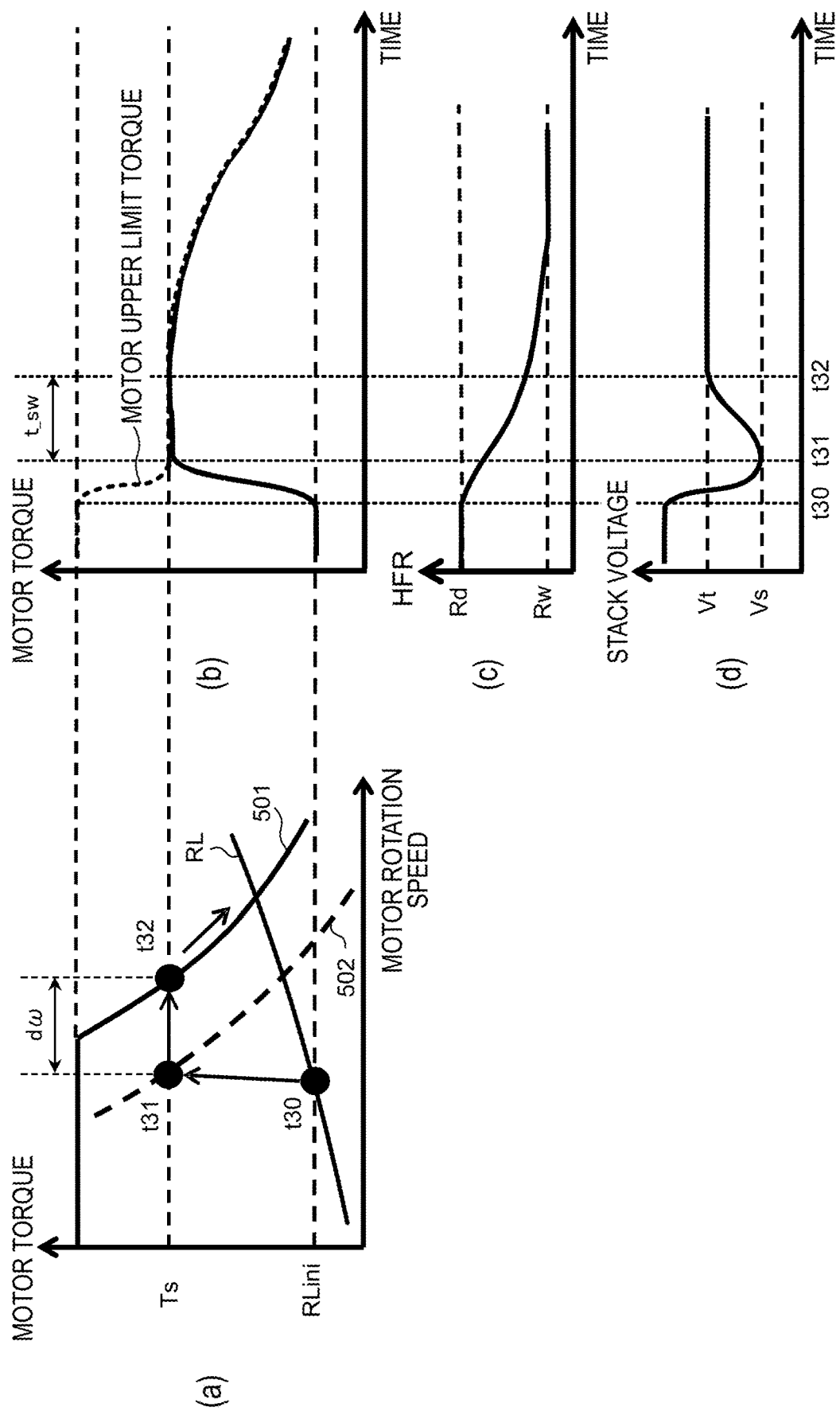
FIG. 16 shows a method of reverting the lower limit voltage of the fuel cell stack according to a second embodiment of the present invention.

FIG. 16 shows one example of processing for reverting the stack lower limit voltage according to a second embodiment of the present invention.

FIG. 16(a) is a diagram of a control method for the driving motor 5 to reduce acceleration vibration G of the vehicle.

FIG. 16(a) shows the torque characteristics 501 and 502 shown in FIG. 7 in correspondence with the motor rotation speed, as well as the road load (RL) characteristic.

FIG. 16(b) shows a temporal change in the motor torque with the reduced acceleration vibration G. In FIG. 16(b), a solid line indicates a change in the torque of the driving motor 5, whereas a dash line indicates a motor upper limit torque.

FIG. 16(c) shows a change in the HFR of the fuel cell stack 1. FIG. 16(d) shows a change in the stack voltage. Horizontal axes in FIGS. 16(b) to 16(d) represent a common time axis.

As shown in FIG. 16(a), at an operation point corresponding to time t30, the driver depresses the accelerator pedal, and a motor requirement torque Ts is calculated. As the HFR is higher than the dry determination threshold Rw as shown in FIG. 16(c), the relaxation voltage Vs that can achieve the motor requirement torque Ts is computed.

As shown in FIG. 16(d), the relaxation voltage Vs is set as the stack lower limit voltage, and the DC/DC converter 3 accordingly reduces the stack voltage to the relaxation voltage Vs lower than the INV performance guarantee voltage Vt. As a result, the driving motor 5 reaches an operation point corresponding to time t31 as shown in FIG. 16(a).

In the present embodiment, a shift period from time t31 to time t32 is set so that the driving motor 5 shifts to an operation point corresponding to time t32 while maintaining the motor torque at time t31 constant.

Specifically, the stack lower limit voltage computation unit 200 calculates the shift period t_sw on the basis of the vehicle inertia J converted into the motor shaft output, RLini at the initial stage of the acceleration, the range of change dω of the motor rotation speed, and the motor torque Ts as indicated by the following expression.

[Math. 1]

$$t\_sw = J\, d\omega/T_s - RL_{ini} \quad (3)$$

Then, as shown in FIG. 16(d), the stack lower limit voltage computation unit 200 gradually increases the stack voltage to the INV performance guarantee voltage Vt in the shift period t_sw from time t31, at which the stack voltage reaches the relaxation voltage Vs, to time t32.

In the shift period t_sw, the motor torque is maintained constant as shown in FIG. 16(b). This can reduce the acceleration vibration of the vehicle, and alleviate the sense of discomfort felt by the driver during the acceleration.

According to the second embodiment of the present invention, the shift period t_sw is preset to reduce the acceleration vibration G of the vehicle, and immediately after the stack voltage reaches the relaxation voltage Vs, the shift period t_sw is taken to shift the stack voltage from the relaxation voltage Vs to the INV performance guarantee voltage Vt.

In this way, the motor torque is maintained constant during the shift period t_sw, thereby reducing the acceleration vibration G of the vehicle. As the sense of sudden acceleration felt by the driver can be alleviated with such a simple configuration, the drivability can be improved.

Third Embodiment

The following describes a configuration of a fuel cell system according to a third embodiment of the present invention.

The configuration of the fuel cell system according to the present embodiment differs in the substance of the stack lower limit voltage computation processing executed in step S910 of FIG. 8. As other constituents are the same as their counterparts in the first embodiment, they are given the same reference signs thereas, and a description thereof is omitted.

Figure 17:
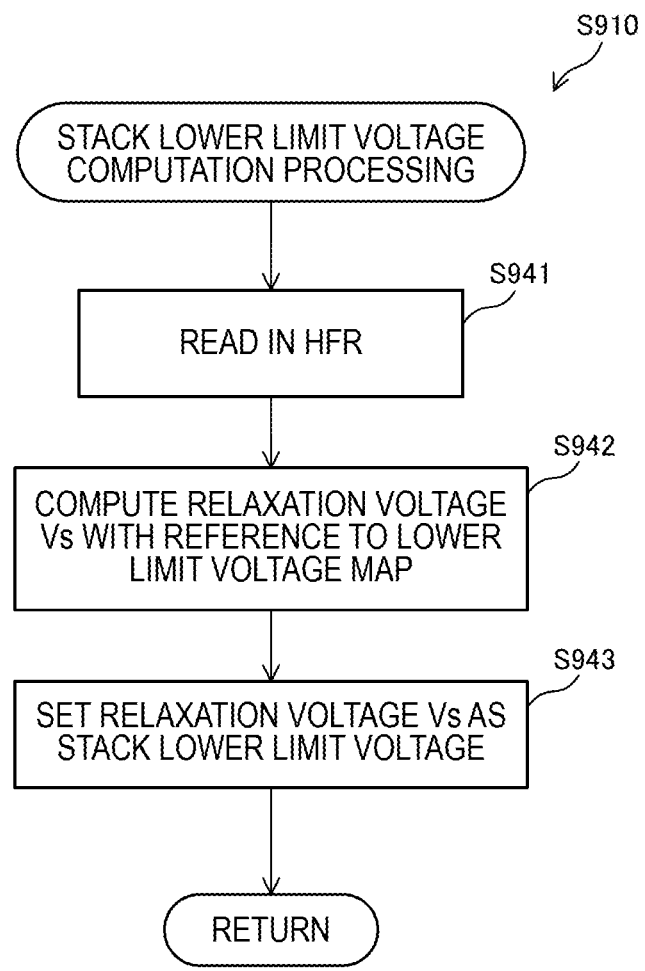
FIG. 17 is a flowchart of stack lower limit voltage computation processing according to a third embodiment of the present invention.

FIG. 17 is a flowchart of the stack lower limit voltage computation processing according to the present embodiment.

In step S941, the stack lower limit voltage computation unit 200 reads in the HFR measured by the internal resistance measuring apparatus 6.

In step S942, the stack lower limit voltage computation unit 200 computes the relaxation voltage Vs on the basis of the HFR. In the present embodiment, the stack lower limit voltage computation unit 200 refers to a preset stack lower limit voltage map, and calculates the relaxation voltage Vs corresponding to the HFR. The details of the stack lower limit voltage map will be described later with reference to FIG. 18.

In step S943, the stack lower limit voltage computation unit 200 sets the relaxation voltage Vs as the stack lower limit voltage.

Figure 18:
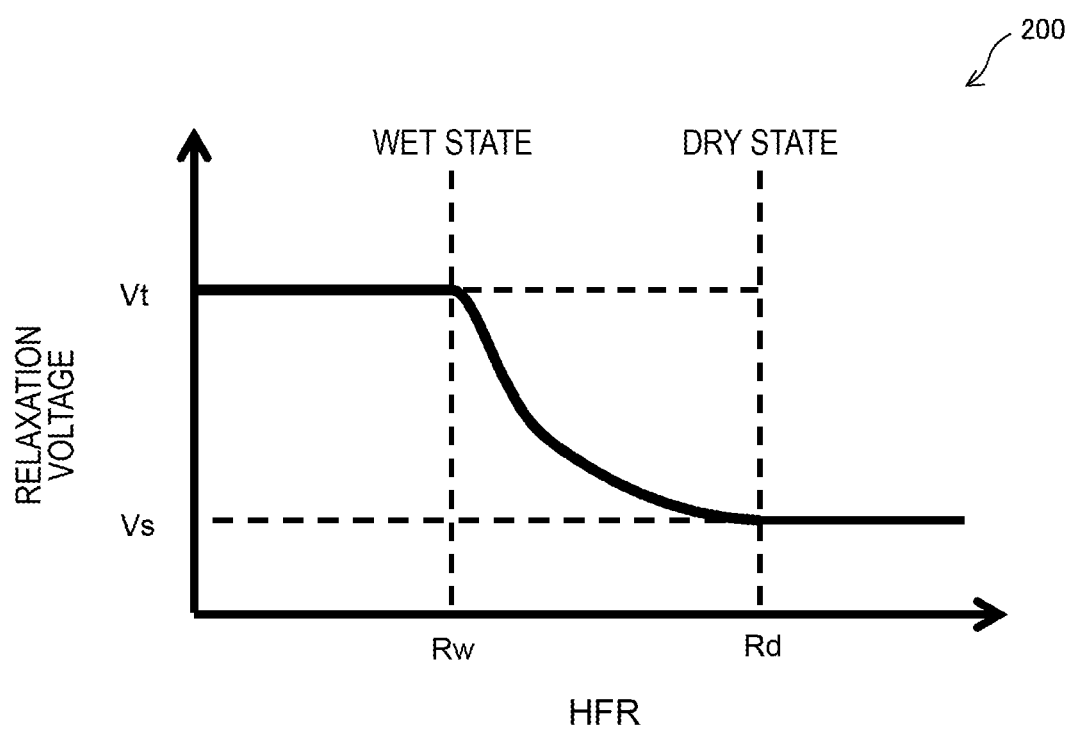
FIG. 18 shows a map indicating a relationship between the HFR and lower limit voltage of the fuel cell stack.

FIG. 18 shows one example of the stack lower limit voltage map stored in the stack lower limit voltage computation unit 200. In FIG. 18, a horizontal axis indicates the HFR, whereas a vertical axis indicates the relaxation voltage.

With use of the stack lower limit voltage map, the INV performance guarantee voltage Vt is set as the stack lower limit voltage when the HFR is smaller than Rw, that is, when the fuel cell stack 1 is in the wet state.

As the HFR becomes large compared with Rw, the I-V characteristic of the fuel cell stack 1 deteriorates, and thus a value smaller than the INV performance guarantee voltage Vt is set as the relaxation voltage. When the HFR is higher than Rd, the relaxation voltage Vs is set as the stack lower limit voltage.

Figure 19:
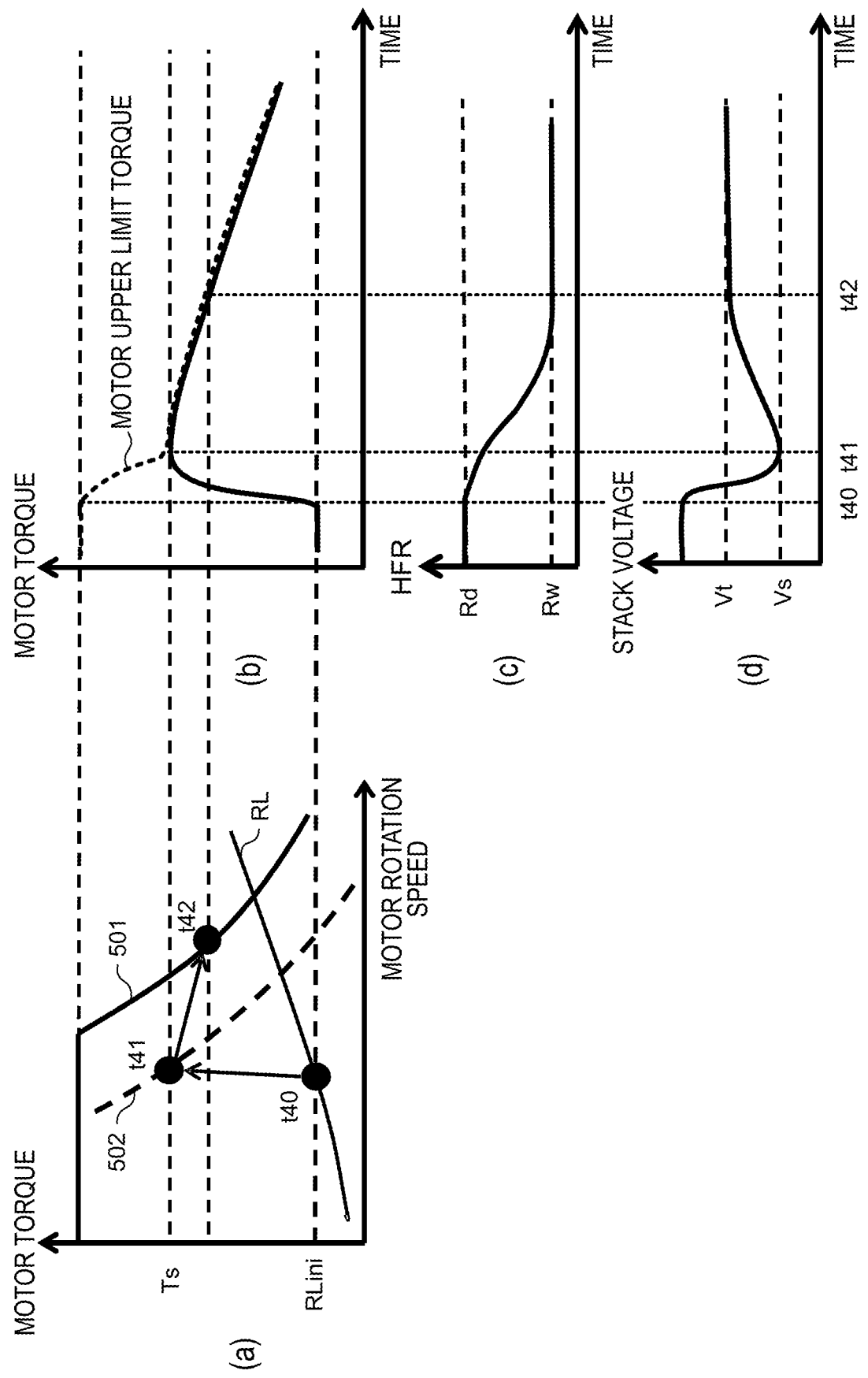
FIG. 19 shows the lower limit voltage of the fuel cell stack that changes in accordance with the HFR.

FIG. 19 is time charts each showing a change in the relaxation voltage based on the HFR of the fuel cell stack 1 according to the present embodiment.

Vertical and horizontal axes in FIGS. 19(a) to 19(d) is the same as those in FIGS. 16(a) to 16(d), respectively. The horizontal axes in FIGS. 19(a) to 19(d) represent a common time axis.

As shown in FIG. 19(a), at an operation point corresponding to time t40, the driver depresses the accelerator pedal. Then, as shown in FIG. 19(d), the DC/DC converter 3 reduces the stack voltage to the relaxation voltage Vs that is determined using the map.

Once the driving motor 5 has reached an operation point corresponding to time t41, the HFR decreases as shown in FIG. 19(c), and consequently, the relaxation voltage gradually increases as shown in FIG. 19(d).

Meanwhile, as the relaxation voltage Vs is set using the map, the motor torque gradually decreases due to somewhat insufficient humidification of the fuel cell stack 1 as shown in FIG. 19(b). As a result, the drivability experienced by the driver is somewhat reduced.

According to the third embodiment of the present invention, with a simple configuration using the stack lower limit voltage map, the relaxation voltage Vs can be appropriately set in accordance with a wetness degree of the electrolyte membranes at the time of issuance of an acceleration request.

Fourth Embodiment

The following describes a configuration of a fuel cell system according to a fourth embodiment of the present invention.

The configuration of the fuel cell system according to the present embodiment differs in the substance of the stack lower limit voltage computation processing executed in step S910 of FIG. 8. As other constituents are the same as their counterparts in the first embodiment, they are given the same reference signs thereas, and a description thereof is omitted.

Figure 20:
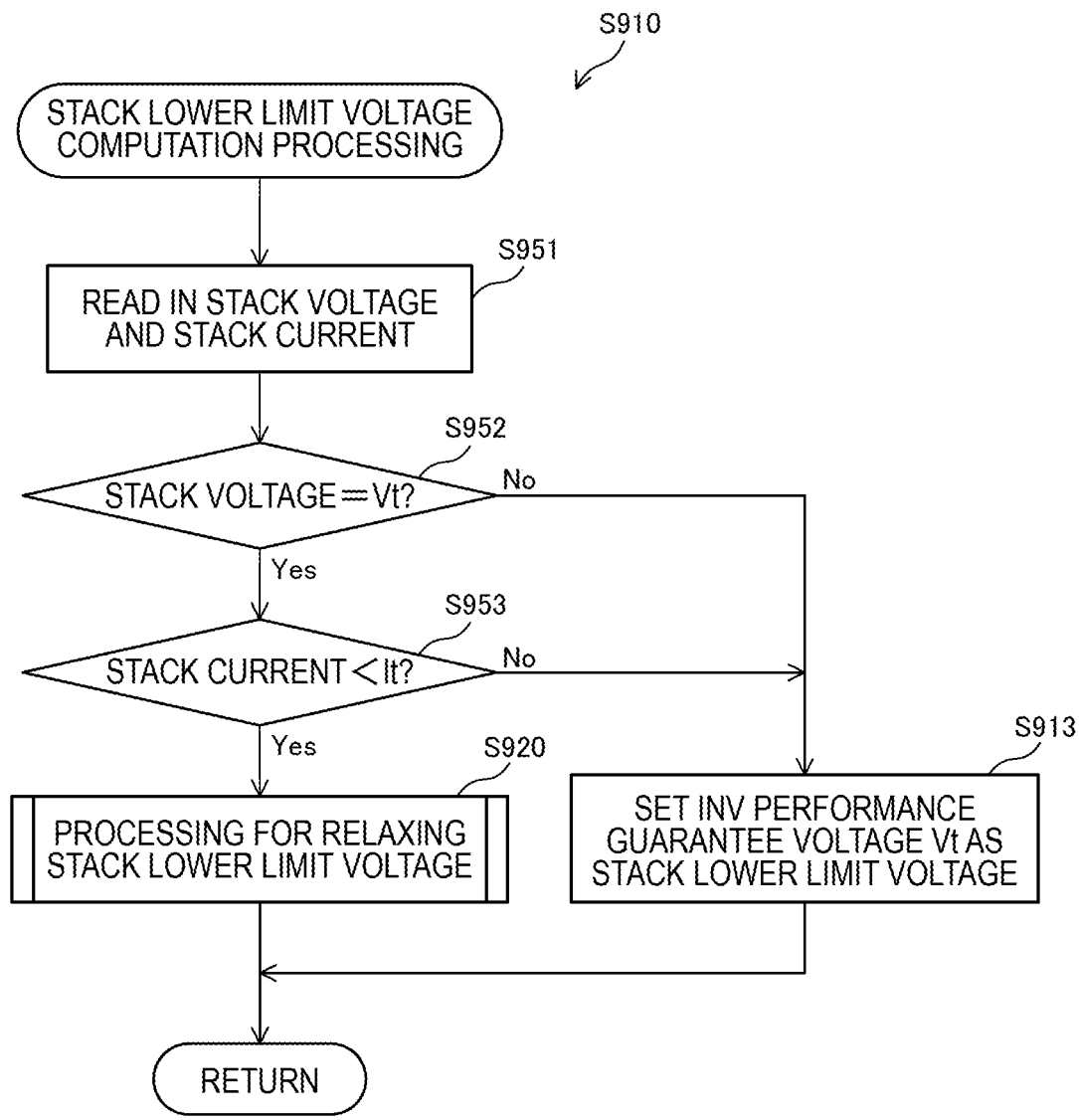
FIG. 20 is a flowchart of stack lower limit voltage computation processing according to a fourth embodiment of the present invention.

FIG. 20 is a flowchart of the stack lower limit voltage computation processing according to the present embodiment. In FIG. 20, processes of steps S951 to S953 are shown in place of steps S911 and S912 shown in FIG. 9. As other processes are the same as their counterparts described with reference to FIG. 9, they are given the same reference signs thereas, and a description thereof is omitted.

In step S951, the stack lower limit voltage setting unit 230 reads in the stack current detected by the stack current sensor 11 and the stack voltage detected by the stack voltage sensor 12.

In step S952, the stack lower limit voltage setting unit 230 determines whether the stack voltage is equal to the INV performance guarantee voltage Vt. If the stack voltage is higher than the INV performance guarantee voltage Vt, processing proceeds to step S913.

If the stack voltage is equal to the INV performance guarantee voltage Vt, the stack lower limit voltage setting unit 230 determines whether the stack current is smaller than the rated current It in step S953.

If the stack current is larger than the rated current It, it is determined that the fuel cell stack 1 is in the wet state, and processing proceeds to step S913. On the other hand, if the stack voltage is equal to the INV performance guarantee voltage Vt and the stack current is smaller than the rated current It, it is determined that the fuel cell stack 1 is in the dry state, and processing proceeds to step S920.

As described above, in the present embodiment, the stack current and the stack voltage are used, in place of the HFR of the fuel cell stack 1, to estimate the wet/dry state of the fuel cell stack 1. Therefore, a poor I-V characteristic can be determined more accurately. This makes it possible to accurately set the relaxation voltage Vs as the stack lower limit voltage.

According to the fourth embodiment of the present invention, the stack lower limit voltage computation unit 200 sets the relaxation voltage Vs as the stack lower limit voltage when the output power of the fuel cell stack 1 is smaller than the power Pt required from the fuel cells, which is computed on the basis of the motor requirement torque. That is, the stack lower limit voltage computation unit 200 sets the relaxation voltage Vs as the stack lower limit voltage in accordance with power output from the fuel cell stack 1.

This makes it possible to reliably determine whether the I-V characteristic of the fuel cell stack 1 is favorable, and hence to prevent unnecessary relaxation of the stack lower limit voltage at the time of issuance of an acceleration request.

Furthermore, in the present embodiment, when the stack current is smaller than the rated current It in a state where the stack voltage has been reduced to the INV performance guarantee voltage Vt, the stack lower limit voltage setting unit 230 sets the relaxation voltage Vs as the stack lower limit voltage so as to make the stack current exceed the rated current It.

Thus reducing the stack lower limit voltage to the relaxation voltage Vs, which can secure the stack current, enables the fuel cell stack 1 to quickly shift to the wet state at the time of acceleration.

The above-described embodiments of the present invention merely present a part of exemplary applications of the present invention, and the specific configurations of the above-described embodiments are not intended to limit a technical scope of the present invention.

Although the above-described embodiments have presented an example in which the DC/DC converter 3 is used as a circuit that adjusts the voltage of the fuel cell stack 1, a circuit that simply adjusts only the voltage of the fuel cell stack 1 may be used in place of the DC/DC converter 3.

Furthermore, although the above-described embodiments have presented an example in which the inverter 4 is connected to the fuel cell stack 1, they may adopt a configuration in which the inverter 4 is connected to the battery 2. This configuration achieves functional effects that are similar to those achieved by the above-described embodiments.

Note that the above-described embodiments can be combined as appropriate.

The invention claimed is:

1. A control method for controlling a fuel cell system including a battery, a fuel cell, an inverter configured to convert power output from the fuel cell into alternating-current power and supply the alternating-current power to a motor, and a converter configured to control voltage between the inverter and the fuel cell using power output from the battery, the control method comprising:
controlling the converter to cause, when power required by the motor increases, the voltage between the inverter and the fuel cell to fall below a voltage lower limit of the inverter, wherein
in controlling the converter, when an electrolyte membrane of the fuel cell is wet, causing the voltage between the inverter and the fuel cell to fall below the voltage lower limit of the inverter is restricted.

2. A fuel cell system, comprising:
a battery;
a fuel cell configured to generate power in accordance with a load;
an inverter configured to convert power output from the fuel cell into alternating-current power and supply the alternating-current power to a motor;
a converter configured to control voltage between the inverter and the fuel cell using power output from the battery; and
a controller programmed to control the converter to:
when power required by the motor increases, cause the voltage between the inverter and the fuel cell to fall below a voltage lower limit of the inverter, and
when an electrolyte membrane of the fuel cell is wet, restrict causing the voltage between the inverter and the fuel cell to fall below the voltage lower limit of the inverter.

3. The fuel cell system according to claim 2, wherein: the controller is programmed to, when the voltage between the inverter and the fuel cell has been reduced to the voltage lower limit of the inverter, reduce the voltage between the inverter and the fuel cell to a relaxation voltage lower than the voltage lower limit of the inverter if power output from the fuel cell is smaller than power required by the motor.

4. The fuel cell system according to claim 2, wherein: the controller is programmed to, when power required by the motor increases, reduce the voltage between the inverter and the fuel cell to a relaxation voltage capable of achieving torque required in the motor without reducing a rotation speed of the motor.

5. The fuel cell system according to claim 3, wherein: the controller is programmed to set a lower limit of the relaxation voltage on the basis of output produced by the motor when the voltage between the inverter and the fuel cell has been reduced to the voltage lower limit of the inverter.

6. The fuel cell system according to claim 5, wherein:
the controller is programmed to, when power required by the motor increases, restrict an act of reducing the voltage between the inverter and the fuel cell to the relaxation voltage if output produced by the motor when voltage of the fuel cell has been reduced to fall below the voltage lower limit of the inverter decreases compared with output produced by the motor when the voltage of the fuel cell has been reduced to the voltage lower limit of the inverter.

7. The fuel cell system according to claim 6, wherein:
the controller is programmed to, when power required by the motor increases, set the voltage between the inverter and the fuel cell to the voltage lower limit of the inverter if output from the motor decreases.

8. The fuel cell system according to claim 2, wherein:
the controller is programmed to, after causing the voltage between the inverter and the fuel cell to fall below the voltage lower limit of the inverter, gradually increase the voltage between the inverter and the fuel cell.

9. The fuel cell system according to claim 8, wherein:
the controller is programmed to, after causing the voltage between the inverter and the fuel cell to fall below the voltage lower limit of the inverter, take a predetermined period to revert the voltage between the inverter and the fuel cell to the voltage lower limit of the inverter.

10. The fuel cell system according to claim 9, wherein:
the predetermined period is set to reduce acceleration vibration of a vehicle.

11. The fuel cell system according to claim 8, wherein:
the controller is programmed to revert a lower limit voltage between the inverter and the fuel cell to the voltage lower limit of the inverter in accordance with a wet/dry state of the fuel cell.

12. The fuel cell system according to claim 8, wherein:
the controller is programmed to, when power required by the motor increases, if a relaxation voltage computed on the basis of torque required in the motor exceeds a predetermined lower limit, gradually increase the voltage between the inverter and the fuel cell to the relaxation voltage.

* * * * *